(12) United States Patent
Sikora et al.

(10) Patent No.: US 10,479,503 B2
(45) Date of Patent: Nov. 19, 2019

(54) SUSPENDED LOAD STABILITY SYSTEMS AND METHODS

(71) Applicant: Vita Inclinata Technologies, Inc., Denver, CO (US)

(72) Inventors: Derek Sikora, Denver, CO (US); Caleb B. Carr, Tacoma, WA (US); Logan Goodrich, Golden, CO (US)

(73) Assignee: Vita Inclinata Technologies, Inc., Denver, CO (US)

( * ) Notice: Subject to any disclaimer, the term of this patent is extended or adjusted under 35 U.S.C. 154(b) by 0 days.

(21) Appl. No.: 16/247,791

(22) Filed: Jan. 15, 2019

(65) Prior Publication Data

US 2019/0241267 A1    Aug. 8, 2019

Related U.S. Application Data

(60) Provisional application No. 62/757,414, filed on Nov. 8, 2018, provisional application No. 62/627,920, filed on Feb. 8, 2018.

(51) Int. Cl.
| | |
|---|---|
| *B64D 9/00* | (2006.01) |
| *B64D 1/08* | (2006.01) |
| *H04W 4/02* | (2018.01) |
| *G05D 1/10* | (2006.01) |
| *B64C 17/00* | (2006.01) |

(52) U.S. Cl.
CPC ............ *B64D 9/00* (2013.01); *B64C 17/00* (2013.01); *B64D 1/08* (2013.01); *G05D 1/10* (2013.01); *H04W 4/026* (2013.01)

(58) Field of Classification Search
CPC ....... B64C 17/00; B64C 39/022; B64C 27/82; B64C 2201/128; B64C 2201/027; B64D 1/08; B64D 9/00; B66C 13/08; B66C 13/063; B66C 13/06; G05D 1/10; H04W 4/026

See application file for complete search history.

(56) References Cited

U.S. PATENT DOCUMENTS

| | | | | |
|---|---|---|---|---|
| 1,935,283 A | * | 11/1933 | Adams | B64D 1/22 258/1.8 |
| 2,651,533 A | * | 9/1953 | Miller | B66C 1/34 403/164 |
| 2,717,656 A | * | 9/1955 | Bannister | G01V 1/047 367/14 |
| 3,036,797 A | * | 5/1962 | Agusta | B64C 1/22 244/137.1 |
| 3,044,818 A | * | 7/1962 | Tobey | B64C 1/22 244/118.1 |

(Continued)

OTHER PUBLICATIONS

Young, L.A., "Enhanced Rescue Lift Capability." 63rd Annual Forum of the AHS International, Virginia Beach, VA, May 1-3, 2007 (May 2007), Fig 2, 5, 12, 16, Abstract, p. 6-12.

*Primary Examiner* — Medhat Badawi
(74) *Attorney, Agent, or Firm* — Aeon Law, PLLC; Adam L. K. Philipp; David V. H. Cohen

(57) ABSTRACT

Load stability systems and methods for stabilizing swinging motions of suspended loads. The load stability systems include a fully automated, self-powered device that employs thrust to counteract and control lateral and rotational motion of an external load. The device is a temporary installment on the load, cable, or boom, and is agnostic to the platform from which it is suspended.

28 Claims, 22 Drawing Sheets

(56) References Cited

U.S. PATENT DOCUMENTS

| | | | | |
|---|---|---|---|---|
| 3,265,336 A * | 8/1966 | Peterson | B64C 1/22 | 244/137.4 |
| 3,554,468 A * | 1/1971 | McVicar | B64D 1/22 | 244/137.4 |
| 3,598,440 A * | 8/1971 | Ramsden | B66C 1/101 | 294/81.3 |
| 3,601,342 A * | 8/1971 | Piasecki | B64D 1/22 | 244/137.4 |
| 3,602,544 A * | 8/1971 | Marsh | B64D 1/22 | 294/74 |
| 3,656,796 A * | 4/1972 | Cook | B66C 1/16 | 294/81.56 |
| 3,690,602 A * | 9/1972 | Marsh | B64D 1/22 | 244/137.4 |
| 3,829,052 A * | 8/1974 | Flannelly | F16F 15/06 | 248/568 |
| 3,838,836 A * | 10/1974 | Asseo | B64D 1/22 | 244/137.4 |
| 3,904,156 A * | 9/1975 | Smith | B64D 1/22 | 244/118.1 |
| 3,946,971 A * | 3/1976 | Chadwick | B64D 1/08 | 244/137.4 |
| 4,124,181 A * | 11/1978 | Kolwey | B64D 1/22 | 244/137.1 |
| 4,138,078 A * | 2/1979 | Hester | B64D 9/00 | 244/137.4 |
| 4,267,987 A * | 5/1981 | McDonnell | B64D 39/00 | 244/137.4 |
| 4,364,704 A * | 12/1982 | Dreesen | B66C 13/32 | 414/624 |
| 4,378,919 A * | 4/1983 | Smith | B64D 1/22 | 244/118.1 |
| 4,553,719 A * | 11/1985 | Ott | B64D 9/00 | 244/118.1 |
| 4,601,444 A * | 7/1986 | Lindenbaum | B64B 1/24 | 244/2 |
| 4,695,012 A * | 9/1987 | Lindenbaum | B64B 1/22 | 244/137.4 |
| 4,747,745 A * | 5/1988 | Pippen | B66C 19/007 | 212/273 |
| 4,826,109 A * | 5/1989 | Camus | B64D 1/22 | 244/137.4 |
| 4,881,601 A * | 11/1989 | Smith | B64D 1/16 | 169/53 |
| 4,883,184 A * | 11/1989 | Albus | B66C 13/06 | 212/274 |
| 4,889,297 A * | 12/1989 | Ikeda | B64C 37/02 | 244/5 |
| 4,984,757 A * | 1/1991 | Hartung | B64D 1/22 | 144/24.13 |
| 5,143,326 A * | 9/1992 | Parks | B64D 1/22 | 244/118.1 |
| 5,190,250 A * | 3/1993 | DeLong | B64D 1/22 | 244/118.1 |
| 5,249,652 A * | 10/1993 | Leitzman | F16F 9/5126 | 188/281 |
| 5,273,333 A * | 12/1993 | Hatfield | B66C 1/34 | 294/82.26 |
| 5,344,203 A * | 9/1994 | Tollenaere | B64D 1/22 | 244/137.1 |
| 5,352,056 A * | 10/1994 | Chandler | B66C 1/66 | 294/82.1 |
| 5,443,566 A * | 8/1995 | Rushmer | B66C 13/063 | 212/275 |
| 5,465,925 A * | 11/1995 | Connolly | B64D 1/12 | 244/137.1 |
| 5,499,785 A * | 3/1996 | Roberts | B64D 1/12 | 244/118.1 |
| 5,518,205 A * | 5/1996 | Wurst | B64B 1/20 | 244/58 |
| 5,562,394 A * | 10/1996 | Brown, Jr. | B66C 1/66 | 294/67.31 |
| 5,593,113 A * | 1/1997 | Cox | B64D 1/08 | 177/245 |
| 5,613,722 A * | 3/1997 | Fandrich | B66C 1/585 | 294/110.1 |
| 5,961,563 A * | 10/1999 | Overton | B66C 13/063 | 212/272 |
| 6,189,834 B1 * | 2/2001 | Dietz | B64D 1/08 | 244/118.1 |
| 6,439,407 B1 * | 8/2002 | Jacoff | B66C 13/06 | 212/272 |
| 6,533,220 B2 * | 3/2003 | Schuster | B64D 1/22 | 244/118.1 |
| 6,578,796 B2 * | 6/2003 | Maeda | B64D 1/16 | 244/136 |
| 6,708,926 B2 * | 3/2004 | Bonisch | B64C 1/22 | 244/1 TD |
| 6,983,833 B2 * | 1/2006 | Ivers | F16F 7/104 | 188/379 |
| 7,267,240 B2 * | 9/2007 | Maurer | B66C 13/063 | 212/270 |
| 7,720,582 B2 * | 5/2010 | Makinadjian | B64C 25/60 | 244/100 R |
| 7,887,011 B1 * | 2/2011 | Baldwin | B64C 37/02 | 244/118.1 |
| 7,948,237 B2 * | 5/2011 | Kuzmin | G01V 3/16 | 324/330 |
| 8,131,384 B2 * | 3/2012 | Karpman | G05B 13/04 | 700/282 |
| 8,157,205 B2 * | 4/2012 | McWhirk | B64B 1/02 | 212/274 |
| 8,226,042 B1 * | 7/2012 | Howell | B63B 27/36 | 244/137.4 |
| 8,292,229 B2 * | 10/2012 | Pancotti | B64C 1/1415 | 244/129.5 |
| 8,413,923 B2 * | 4/2013 | Brenner | B64C 27/001 | 244/17.13 |
| 8,534,607 B2 * | 9/2013 | Tardiff | B64D 17/38 | 244/137.1 |
| 8,534,608 B1 * | 9/2013 | Cox, IV | A01G 23/095 | 244/118.1 |
| 8,840,355 B1 * | 9/2014 | Kulesha | B64D 1/22 | 414/626 |
| 8,886,402 B1 * | 11/2014 | Lou | B64C 25/60 | 188/266 |
| 8,888,048 B2 * | 11/2014 | Figoureux | B64D 1/22 | 244/118.1 |
| 8,894,050 B2 * | 11/2014 | Wootten | B60G 17/048 | 267/64.18 |
| 8,899,903 B1 * | 12/2014 | Saad | B65G 67/00 | 414/392 |
| 8,903,568 B1 * | 12/2014 | Wang | G05D 1/0016 | 701/2 |
| 8,938,325 B1 * | 1/2015 | McGinnis | B66C 13/08 | 701/4 |
| 8,967,533 B2 * | 3/2015 | DeVaul | B64B 1/40 | 244/97 |
| 9,027,976 B1 * | 5/2015 | Tollenaere | B64D 1/22 | 244/137.4 |
| 9,096,294 B1 * | 8/2015 | Dong | B63B 27/32 | |
| 9,114,871 B2 * | 8/2015 | Woodworth | B64D 27/26 | |
| 9,205,922 B1 * | 12/2015 | Bouwer | B64D 9/00 | |
| 9,223,008 B1 * | 12/2015 | Hartman | G01S 5/163 | |
| 9,242,741 B1 * | 1/2016 | Cockell, II | B64D 17/383 | |
| 9,302,770 B2 * | 4/2016 | Burgess | B64D 1/12 | |
| 9,800,091 B2 * | 10/2017 | Nugent, Jr. | H04B 10/807 | |
| 9,836,063 B1 * | 12/2017 | Bonawitz | B64B 1/40 | |
| 9,881,506 B1 * | 1/2018 | Gentry | H04W 76/10 | |
| 10,023,313 B2 * | 7/2018 | Behrens | F16M 13/02 | |
| 2003/0222177 A1 * | 12/2003 | Bonisch | B64C 1/22 | 244/137.1 |
| 2005/0242237 A1 * | 11/2005 | Scott | B64C 7/00 | 244/118.1 |
| 2007/0200032 A1 * | 8/2007 | Eadie | B64D 1/22 | 244/137.4 |
| 2009/0004004 A1 * | 1/2009 | Vincenzi | B64C 27/027 | 416/1 |

(56) References Cited

U.S. PATENT DOCUMENTS

| | | | |
|---|---|---|---|
| 2009/0152391 A1* | 6/2009 | McWhirk | B64B 1/02 244/30 |
| 2011/0192932 A1* | 8/2011 | Brenner | B64C 27/04 244/17.13 |
| 2012/0145832 A1* | 6/2012 | Schuster | B64D 1/22 244/137.4 |
| 2012/0150364 A1* | 6/2012 | Tillotson | G05D 1/101 701/3 |
| 2012/0292434 A1* | 11/2012 | Welsh | B64C 27/001 244/17.27 |
| 2012/0293177 A1 | 11/2012 | Dodds | |
| 2013/0054054 A1* | 2/2013 | Tollenaere | B64D 1/22 701/3 |
| 2013/0056586 A1* | 3/2013 | Occhiato | B64D 1/22 244/137.4 |
| 2013/0270393 A1* | 10/2013 | Shrapnel | B64D 1/22 244/137.4 |
| 2013/0299634 A1* | 11/2013 | Haggard | B64D 1/00 244/110 F |
| 2014/0224755 A1* | 8/2014 | Eriksson | B66C 13/06 212/273 |
| 2014/0252170 A1* | 9/2014 | Prud'Homme-Lacroix | B64C 7/00 244/121 |
| 2015/0041598 A1* | 2/2015 | Nugent | H02J 17/00 244/53 R |
| 2015/0360779 A1* | 12/2015 | Behrens | B64D 1/22 244/137.4 |
| 2016/0009393 A1* | 1/2016 | Repp | B64D 1/22 701/34.4 |
| 2016/0031683 A1* | 2/2016 | Fenker | B66C 13/40 212/276 |
| 2016/0048131 A1* | 2/2016 | Lesperance | B64D 1/22 701/8 |
| 2016/0236779 A1* | 8/2016 | Thomas | B64D 1/22 |
| 2016/0332728 A1* | 11/2016 | Winfree | B64D 1/22 |
| 2016/0340039 A1* | 11/2016 | Waltner | B64D 1/22 |
| 2017/0284795 A1* | 10/2017 | Carlson | G01B 11/26 |
| 2017/0291707 A1* | 10/2017 | Veronesi | B64C 19/00 |
| 2018/0099748 A1* | 4/2018 | Lesperance | B64C 27/04 |
| 2018/0282130 A1* | 10/2018 | Kale | B66C 13/30 |
| 2019/0193827 A1* | 6/2019 | Zerweckh | B64B 1/24 |
| 2019/0241267 A1* | 8/2019 | Sikora | B64C 17/00 |

* cited by examiner

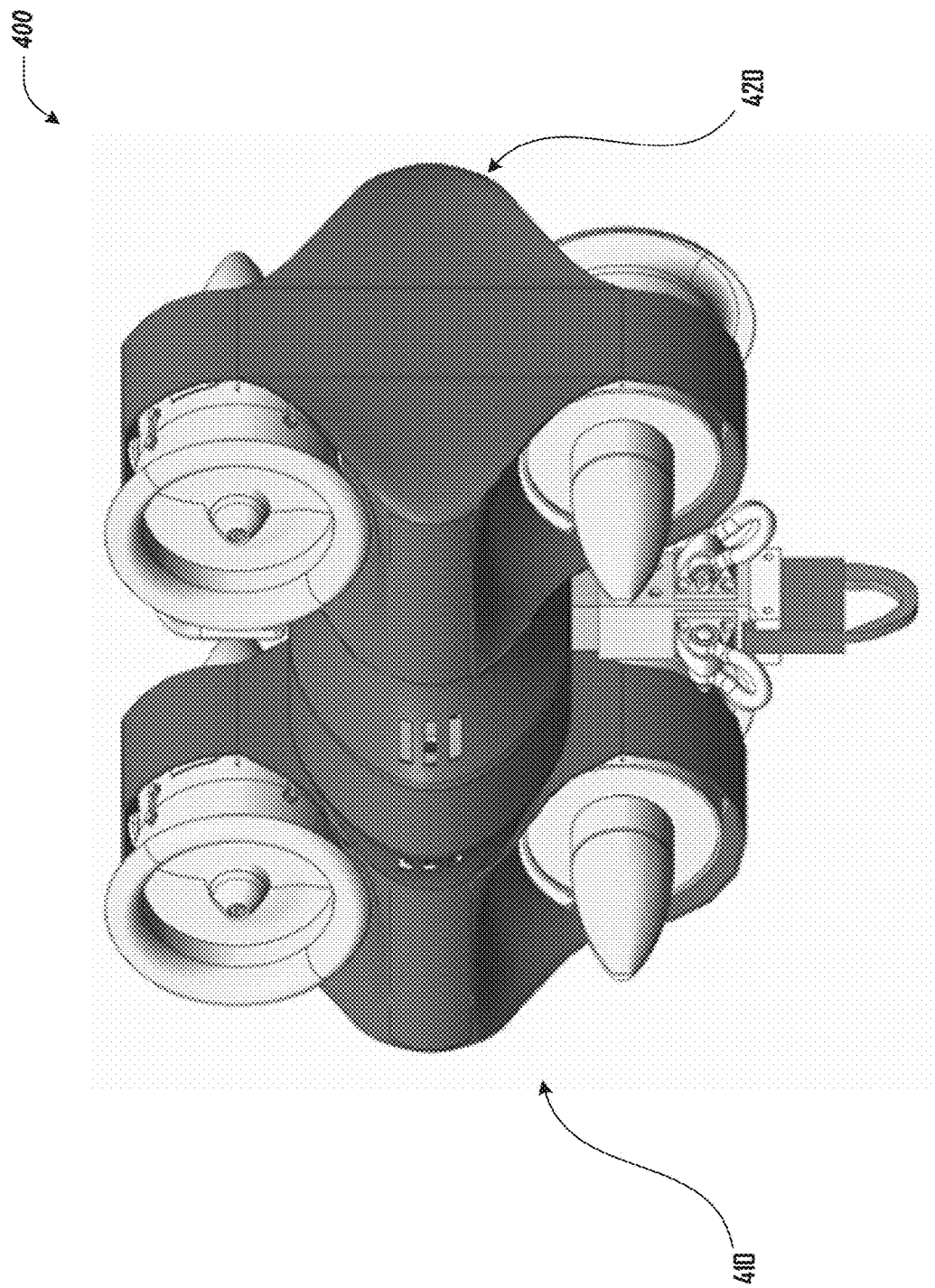

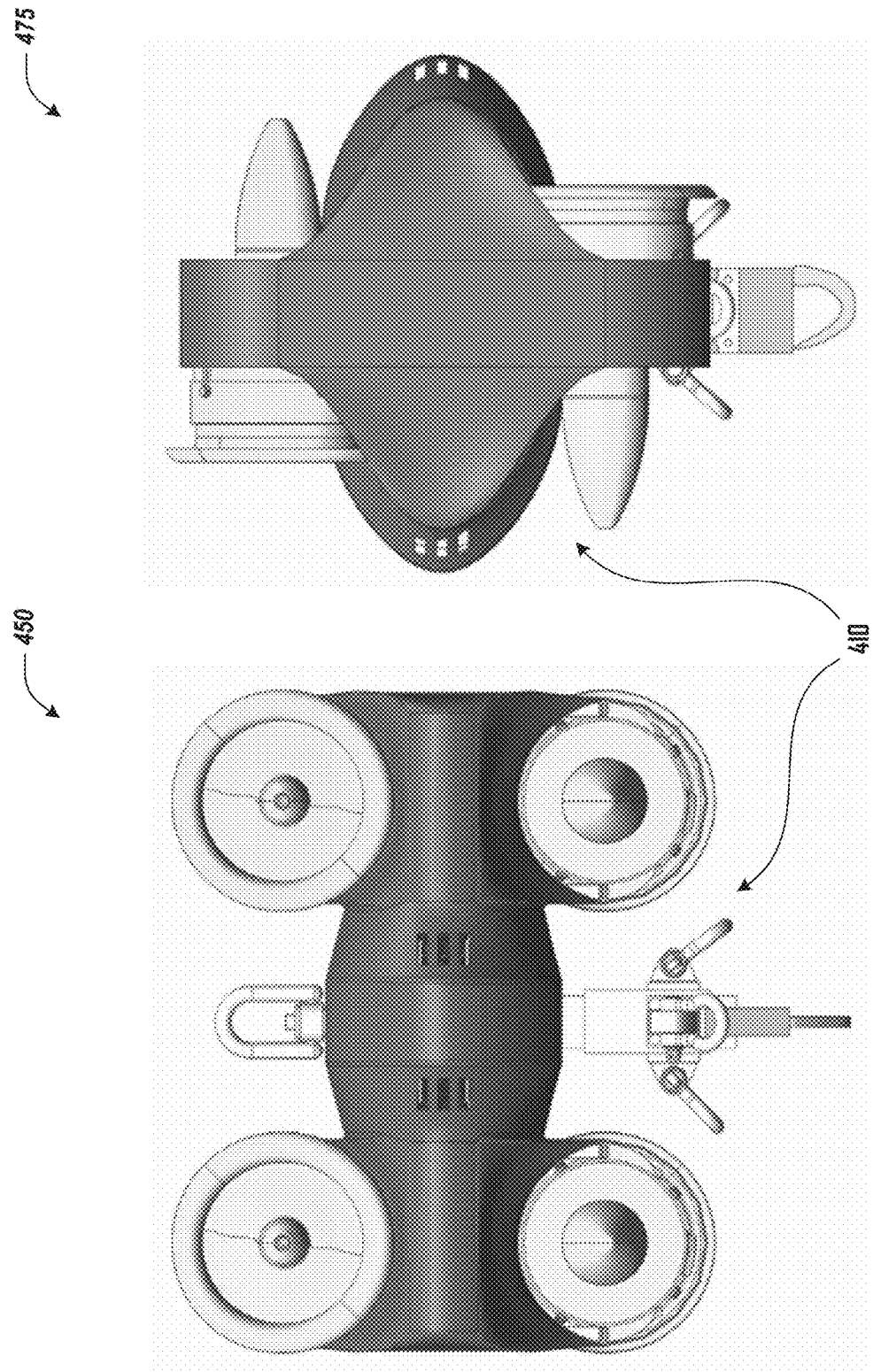

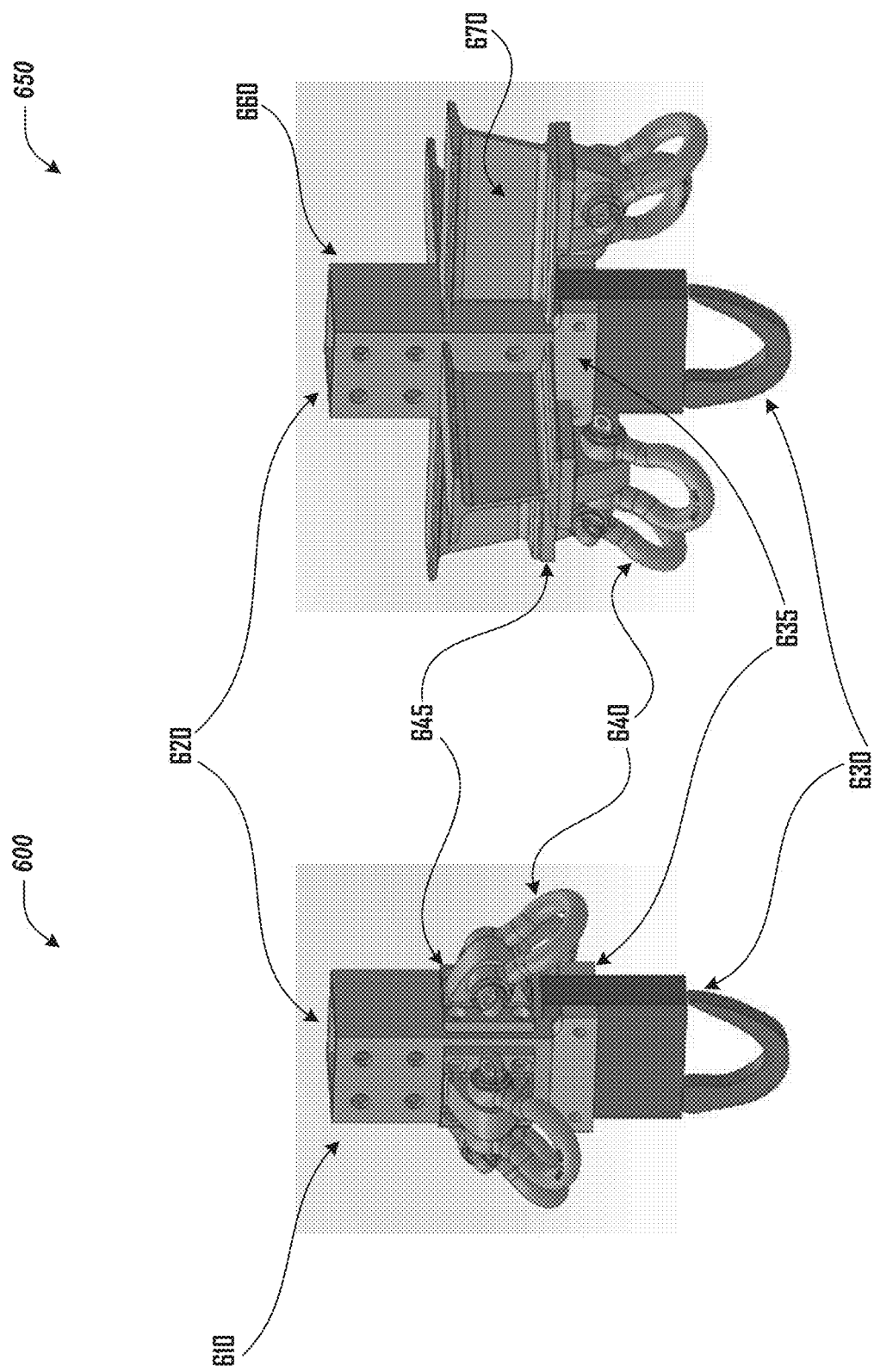

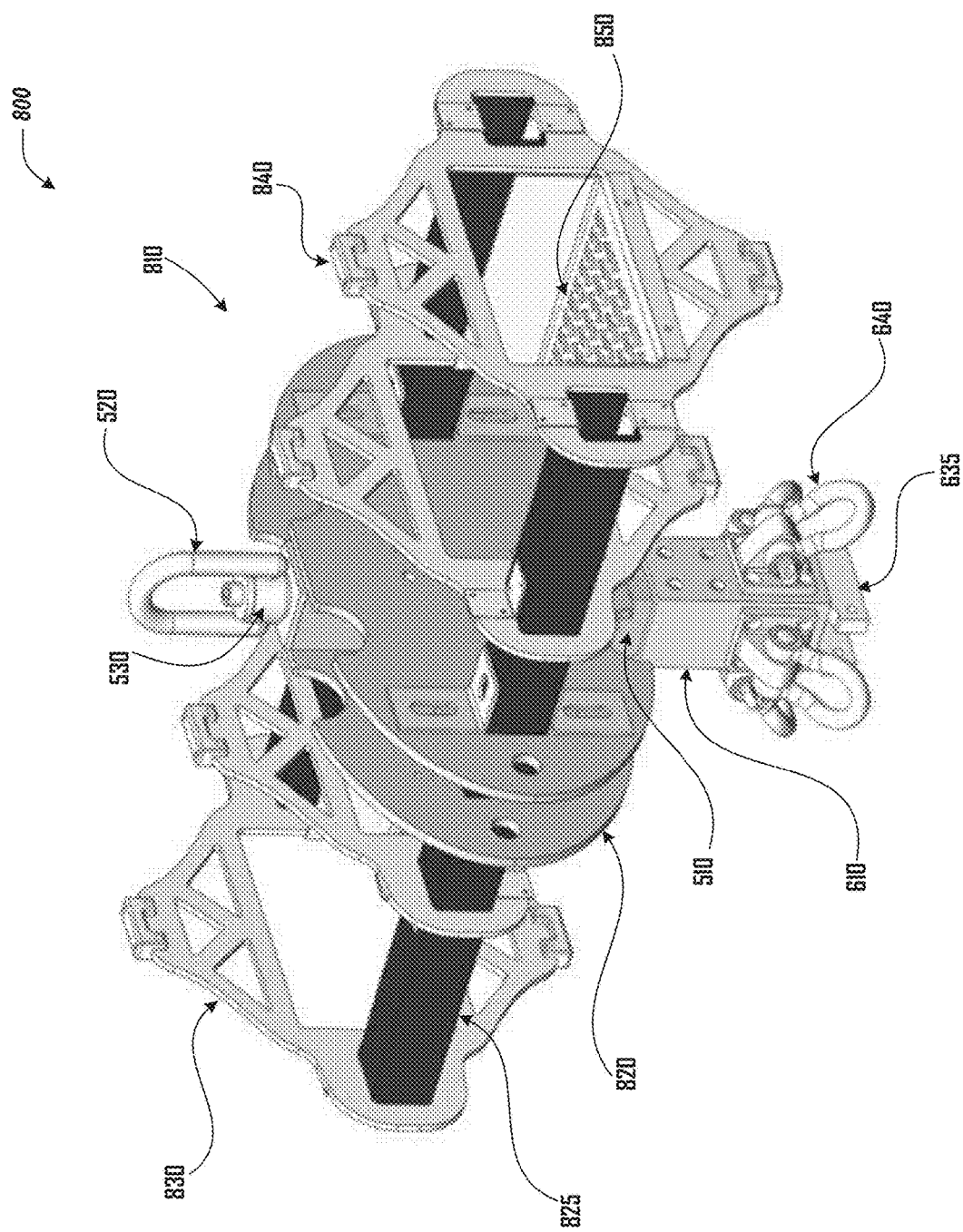

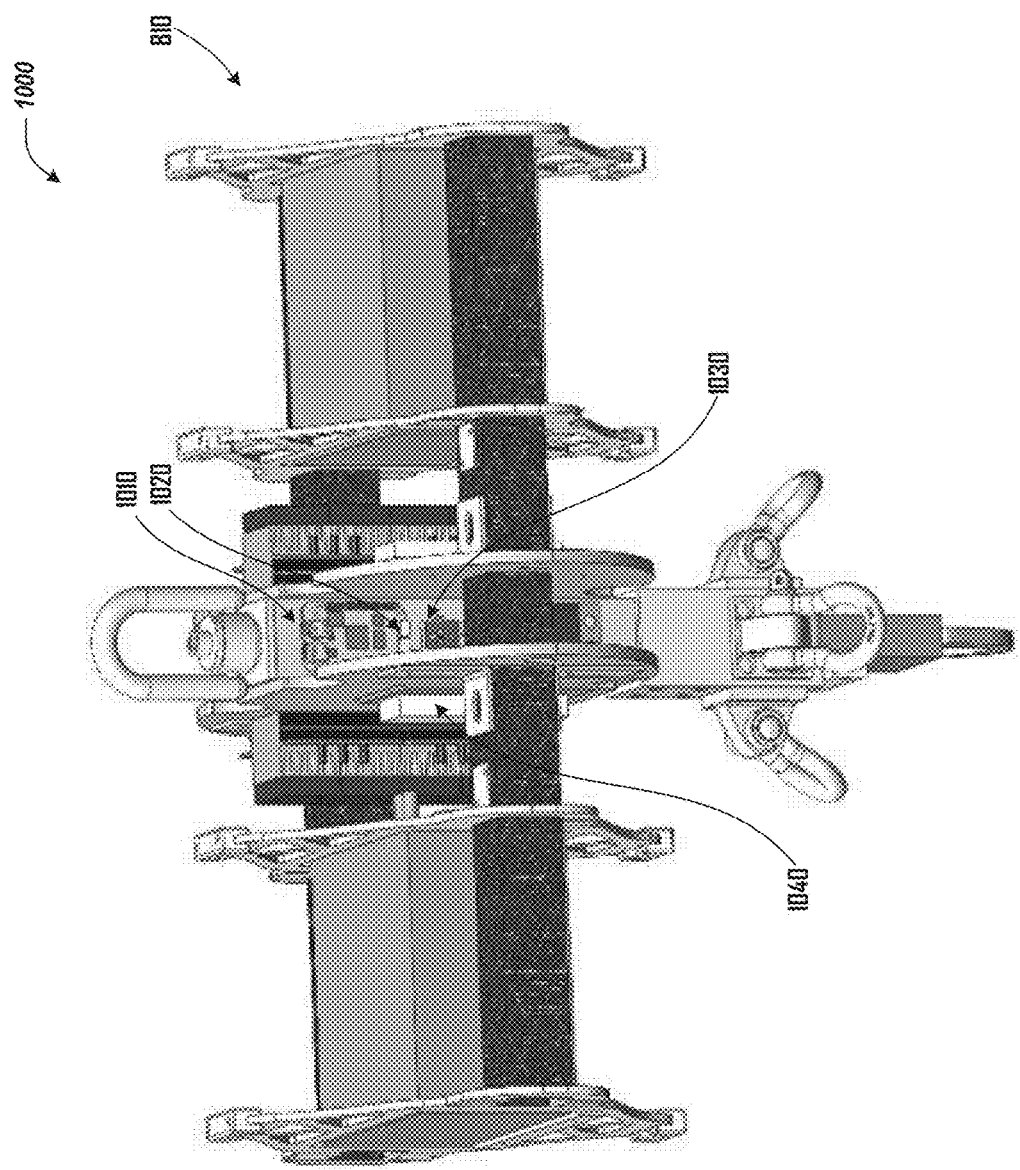

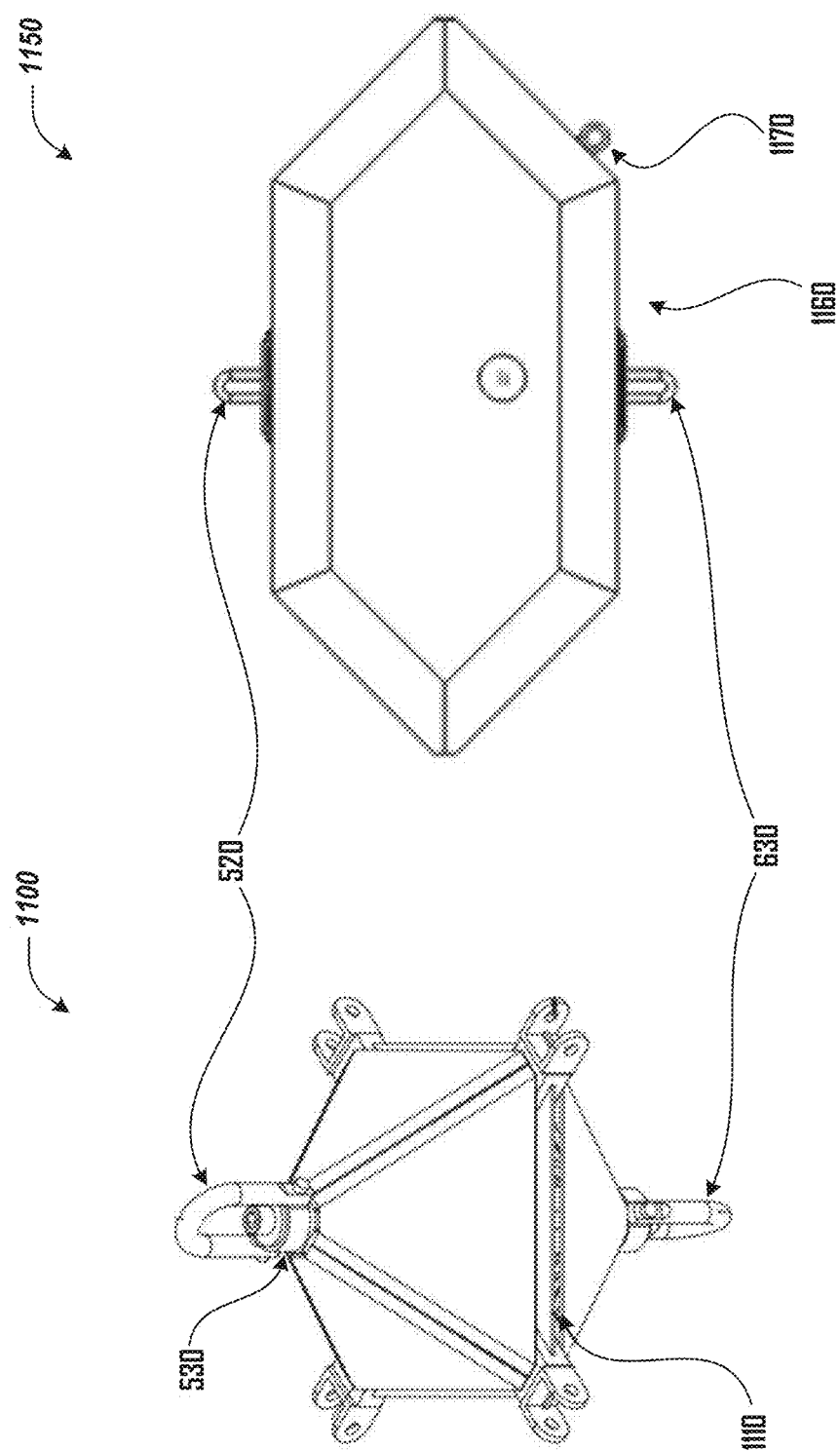

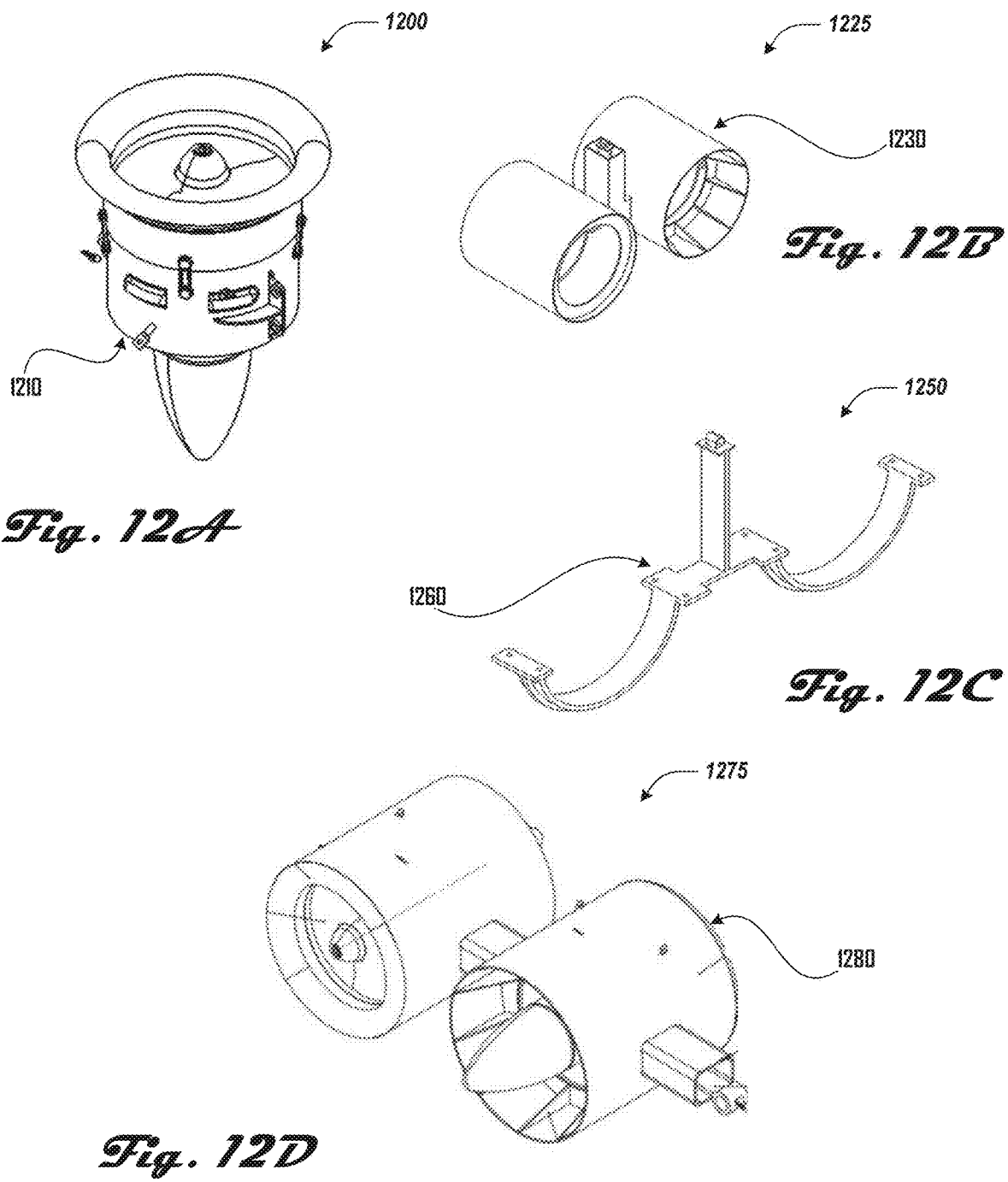

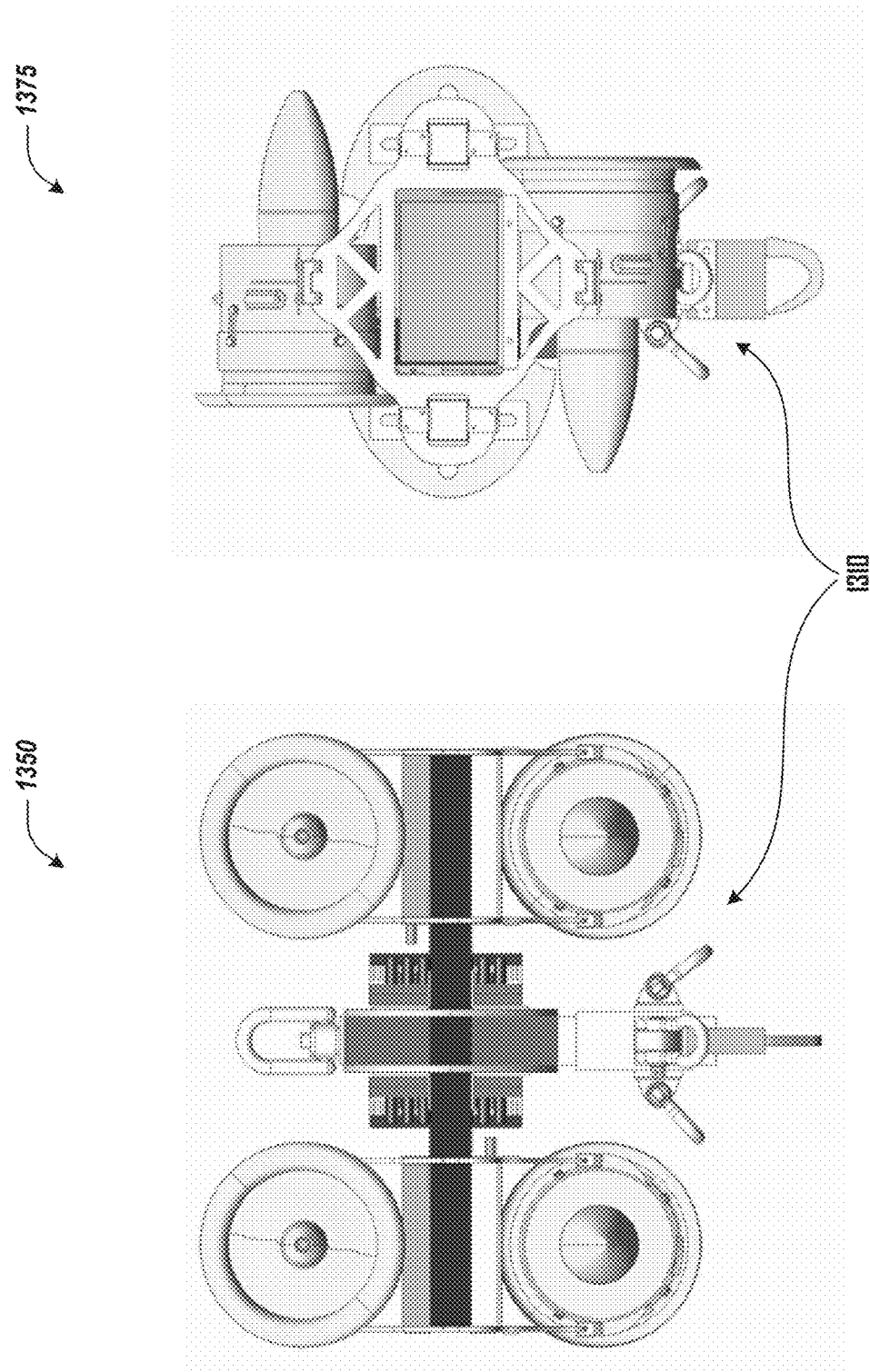

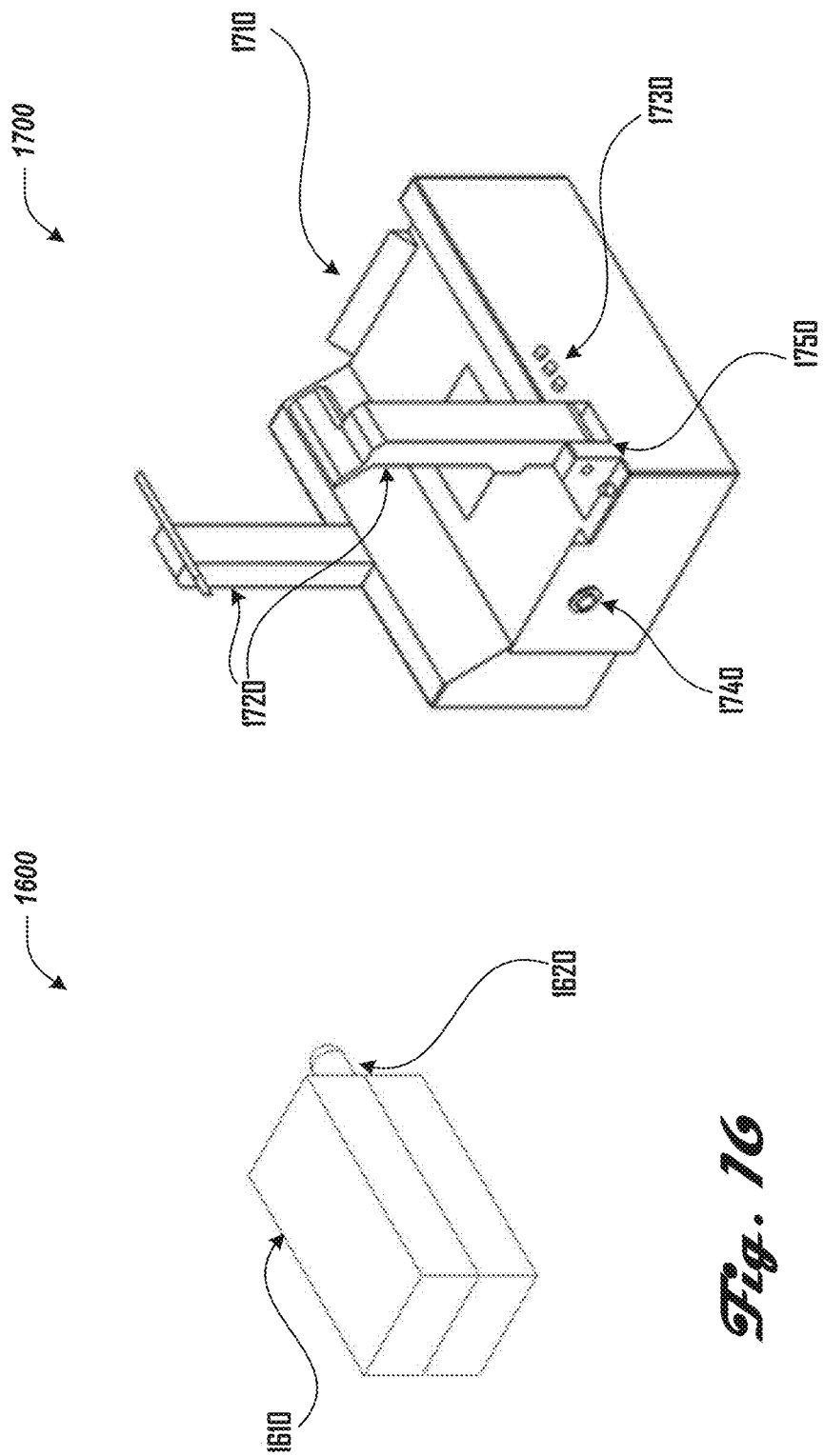

SUSPENDED LOAD STABILITY SYSTEMS AND METHODS

This application claims priority to provisional U.S. Patent Application No. 62/627,920, filed Feb. 8, 2018, titled "SUSPENDED LOAD STABILITY SYSTEM THROUGH SELF POWERED AUTOMATED ELECTRIC DUCT FAN CONTROL," and naming Derek Sikora and Jonathan Chung as inventors, and provisional U.S. Patent Application No. 62/757,414, filed on Nov. 8, 2018, titled "LOAD STABILITY SYSTEM FOR SUSPENDED LOAD CHAOTIC MOTION," and naming Caleb Carr, Derek Sikora, and Logan Goodrich as inventors. The above cited applications are hereby incorporated by reference, in their entireties, for all purposes. The Application Data Sheet filed herewith forms a part of the present application, and all priority documents to which it refers are incorporated by reference herein in their entirety.

FIELD

This disclosure is directed to improved systems and methods to control suspended loads.

BACKGROUND

Rescue helicopters allow for quick access to injured or isolated patients on sea or land. More times than not, the patients are injured or have a medical emergency that warranted the local or federal authorities to authorize the use of an expensive helicopter hoisting operation. During these operations, however, hoisting extractions are subject to winds and other external factors that cause the rescue hoist to spin and swing back and forth. This swinging complicates the mission, causes delays in medical care, and has led to deaths both of rescuers and the rescuees.

In modern helicopter hoist, rescue, and sling load operations there is often unstable, hazardous motion of the suspended person or equipment that endangers the operation at hand and, more importantly, the people involved. The observed motion is comparable to a lateral or conical pendulum, with rotation about the hinge pivot point. A mission-critical attribute of the hoist system operability remains unsolved: reliable stability of slung cable motion. Uncontrolled cable motion endangers lives, jeopardizes mission success, sacrifices mission opportunities due to environmental elements, and drastically increases operational costs.

BRIEF DESCRIPTION OF THE DRAWINGS

FIGS. 4A-4C illustrate perspective, front, and side views of a suspended load stability system including an aerodynamic housing in accordance with one embodiment.

FIGS. 6A-6B illustrate two alternative sleeves that connect to the central structural member for attaching a load in accordance with one embodiment.

FIG. 8 illustrates a perspective view of a structural framework of a suspended load stability system in accordance with one embodiment.

FIG. 10 illustrates a perspective view of components of a suspended load stability system mounted in the structural framework in accordance with one embodiment.

FIG. 11A illustrates a perspective view of an alternative center module design of a suspended load stability system in accordance with one embodiment.

FIG. 11B illustrates a front view of another alternative center module design of a suspended load stability system in accordance with one embodiment.

FIG. 12A illustrates a perspective view of a thruster configured for use in a suspended load stability system in accordance with one embodiment.

FIG. 12B illustrates a perspective view of a two-thruster propulsion arm of a suspended load stability system in accordance with one embodiment.

FIG. 12C illustrates a perspective view of a support member for a two-thruster propulsion arm of a suspended load stability system in accordance with one embodiment.

FIG. 12D illustrates an isometric view of another two-thruster propulsion arm of a suspended load stability system in accordance with one embodiment.

FIGS. 13A-13C illustrate perspective, front, and side views of thrusters mounted in the structural framework of a suspended load stability system in accordance with one embodiment.

FIG. 16 illustrates a perspective view of a remote positional unit or target node of a suspended load stability system in accordance with one embodiment.

FIG. 17 illustrates a perspective view of a charging station for a suspended load stability system in accordance with one embodiment.

DETAILED DESCRIPTION

Figure 1:
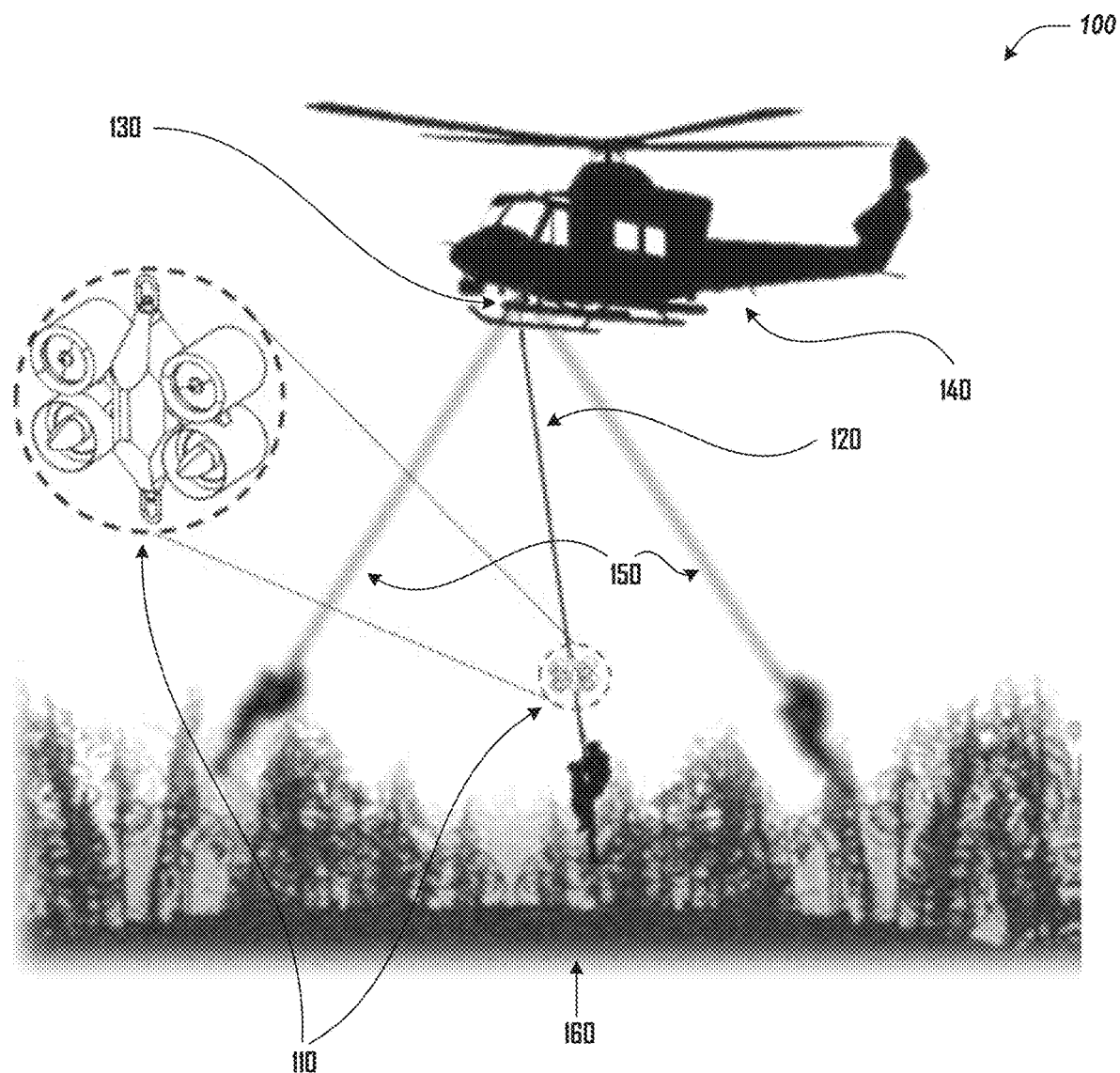
FIG. 1 schematically illustrates a swinging load suspended from a helicopter and stabilized by a suspended load stability system ("LSS").

The general approach for controlling swinging load behavior is to install countermeasures on the airframe or to manipulate the airframe itself. Some airframes, such as the Sky Crane, have a rail system installed beneath the cabin to mitigate the sway of a load. Most proposed approaches involve installing automated countering algorithms on an aircraft's stability augmentation system. Indeed, crew chiefs who remain within the helicopter during an extraction will try to manipulate the cable by pushing and pulling it from the cabin, efforts that have limited effect. All these measures have proved inadequate.

In various embodiments, as described further herein, an autonomous, unmanned suspended load stability control system addresses this problem. The load stability system ("LSS") of this disclosure counteracts suspended load motion by exerting counterforce from thrusters such as high performance electric ducted fans ("EDFs") at, or near, the location of the load. Consequently the LSS enhances mission safety by completely relieving the pilot and crew of suspended load stability responsibilities. Moreover, the performance envelope of such operations is increased by integrating the capability of the LSS to dynamically control load location, separate from aircraft motion.

The Load Stability System controls the motion of a suspended load through a self-powered, automated, detachable system onto the cable itself between the hoisting system (i.e. helicopter) and the external load. The system is agnostic to the platform from which the load is suspended (e.g., the characteristics of a helicopter "ownship"), as it will independently determine the flight dynamics necessary to stabilize the load. This permits widespread adoption of the system regardless of aircraft type, lowering cost and mitigating solution risks.

The load stability system can provide benefits to helicopter search and rescue ("SAR") and sling load operations, forest fire helicopters, crane operations on Oil Rigs, Navy Support Ships, construction based sling load operations, deep sea drilling applications, space ship control, and civilian firefighting.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein. For example, the embodiments set forth below are primarily described in the context of a helicopter sling load or search and rescue operation. However, these embodiments are illustrative examples and in no way limit the disclosed technology to any particular application or platform.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

FIG. 1 schematically illustrates a swinging load suspended from a helicopter 140 and stabilized by a suspended load stability system ("LSS") 110. The helicopter "ownship" platform 140 suspends a person on a cable 120 from a point 130. Without the LSS 110, the cable and suspended person are liable to swing 150 laterally and/or in conical motion. With the LSS 110, wild swinging is counteracted and eliminated, so that the person can be delivered to the desired point or location of interest 160.

The LSS can take a variety of form factors. FIGS. 1, 2A-2B, 3, and 4A-4C illustrate several different arrangements and housing designs. The illustrated systems each employ two pairs of unidirectional thrusters. In other embodiments, a load stability system could employ bidirectional thrusters in different numbers or arrangements. However, it is not necessary to show such implementation details to describe illustrative embodiments.

Figure 2A:
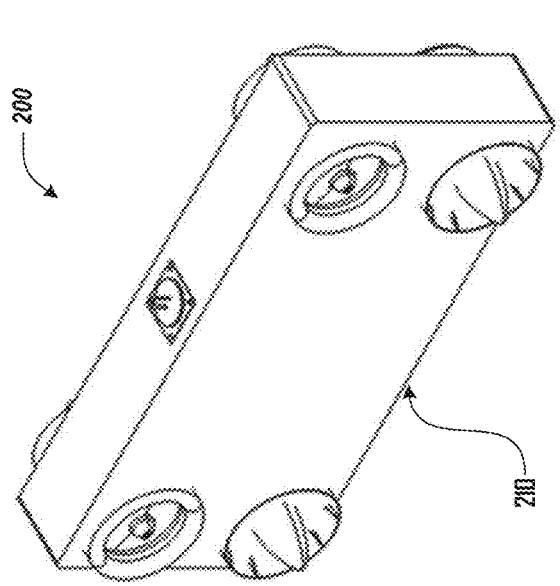
FIG. 2A illustrates an isometric view of a suspended load stability system with a boxlike housing in accordance with one embodiment.

FIG. 2A illustrates an isometric view 200 of a suspended load stability system with a boxlike housing 210 in accordance with one embodiment. The system 210 is completely enclosed within a box-like enclosure, allowing open access only for the thrusters, cable and load attachments, and charging nodes. While the rectangular housing of system 210 is not especially aerodynamic, it may contain and protect a larger cubic volume than other designs. The larger useful internal volume may allow a greater energy capacity (e.g., a larger number of batteries or other power supply means), allowing system 210 to provide more powerful thrusters and/or a longer operational capacity before recharging or refueling.

Figure 2B:
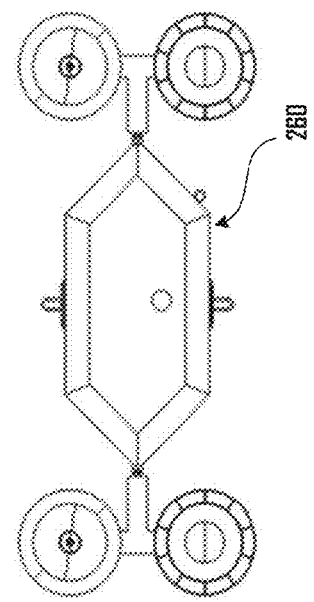
FIG. 2B illustrates a front view of a suspended load stability system including a hexagonal center module and two propulsion arms in accordance with one embodiment.

FIG. 2B illustrates a front view 250 of a suspended load stability system 260 including a hexagonal center module and two propulsion arms in accordance with one embodiment. The system 260 provides an improved aerodynamic profile compared to the system 210 of FIG. 2A. The system 260 also offers more compact storage or stowage, and easier maintenance, by allowing the two propulsion arms to be removable. FIG. 11B below illustrates the system 260 with its propulsion arms removed, and FIGS. 12B-12C illustrate the removable propulsion arms.

Figure 3:
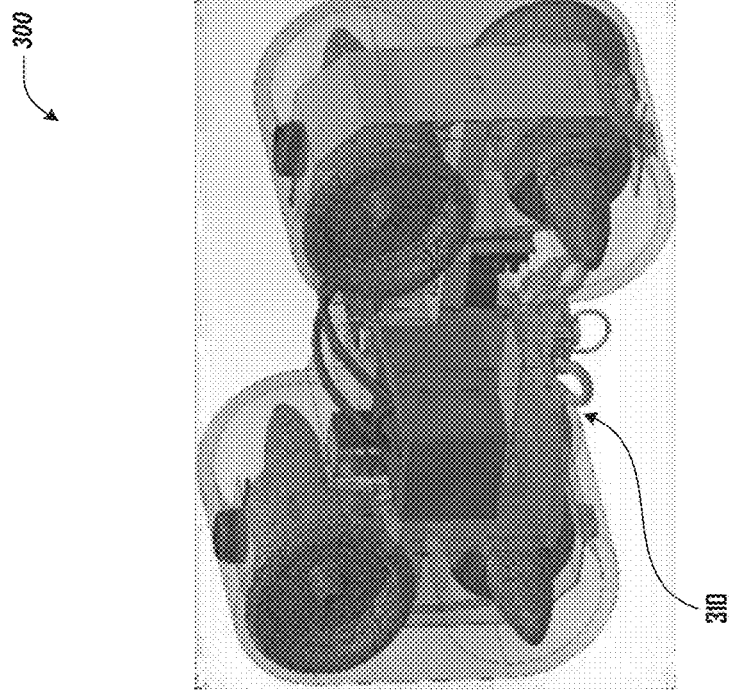
FIG. 3 illustrates a cutaway perspective view of a suspended load stability system showing structural features in accordance with one embodiment.

FIG. 3 illustrates a cutaway perspective view 300 of a suspended load stability system 310 showing structural features in accordance with one embodiment. The system 310 is made up of an internal skeleton and external shell. The external shell is a lightweight material like carbon fiber that surrounds the internal skeleton. The skeleton is made up of a lightweight machined alloy. The cutaway or transparent housing of view 300 shows various internal components and structural elements. The structural elements include a horizontal structural box beam that connects to a C-shaped arm supporting electric ducted fan thrusters above and below the horizontal structural box beam. Atop the C-shaped arms are round sensors, similar to those discussed below with reference to FIG. 14. Also prominently visible is the dark rectangular shape of a battery with power cables attached to power the electric ducted fan thrusters.

In various embodiments, the LSS may be powered by a combination of on-board and remote power. In many environments, all power for the LSS is contained on board, allowing fully autonomous operation without dependence on the availability of external power sources or delivery means. In some situations, a platform from which the LSS is suspended, such as a helicopter or crane, can provide the LSS power through a line extending down the slung cable to the LSS. In some other situations, the platform can provide power to the LSS, which carries a smaller power supply or power reserve on board for intermittent use.

FIGS. 4A-4C illustrate perspective, front, and side views of a suspended load stability system 410 including an aerodynamic housing 420 in accordance with one embodiment. FIG. 4A illustrates perspective view 400, FIG. 4B illustrates front view 450, and FIG. 4C illustrates side view 475.

The housing 420 may be formed of any suitable material such as metal, plastic, glass fiber-reinforced plastic, or carbon fiber. The slim and aerodynamic profile of the illustrated housing 420 provides minimal wind resistance, a short central beam length, improved efficiency for the thrusters, sufficient projection to protect from or divert obstacles, and easy access for maintenance of the LSS. The housing may allow access into the internal space of the LSS via a sealed hatch or one or more removable panels, allowing for maintenance and inspection.

Additional features and construction of the LSS 410 are described in the following Figures.

Figure 5:
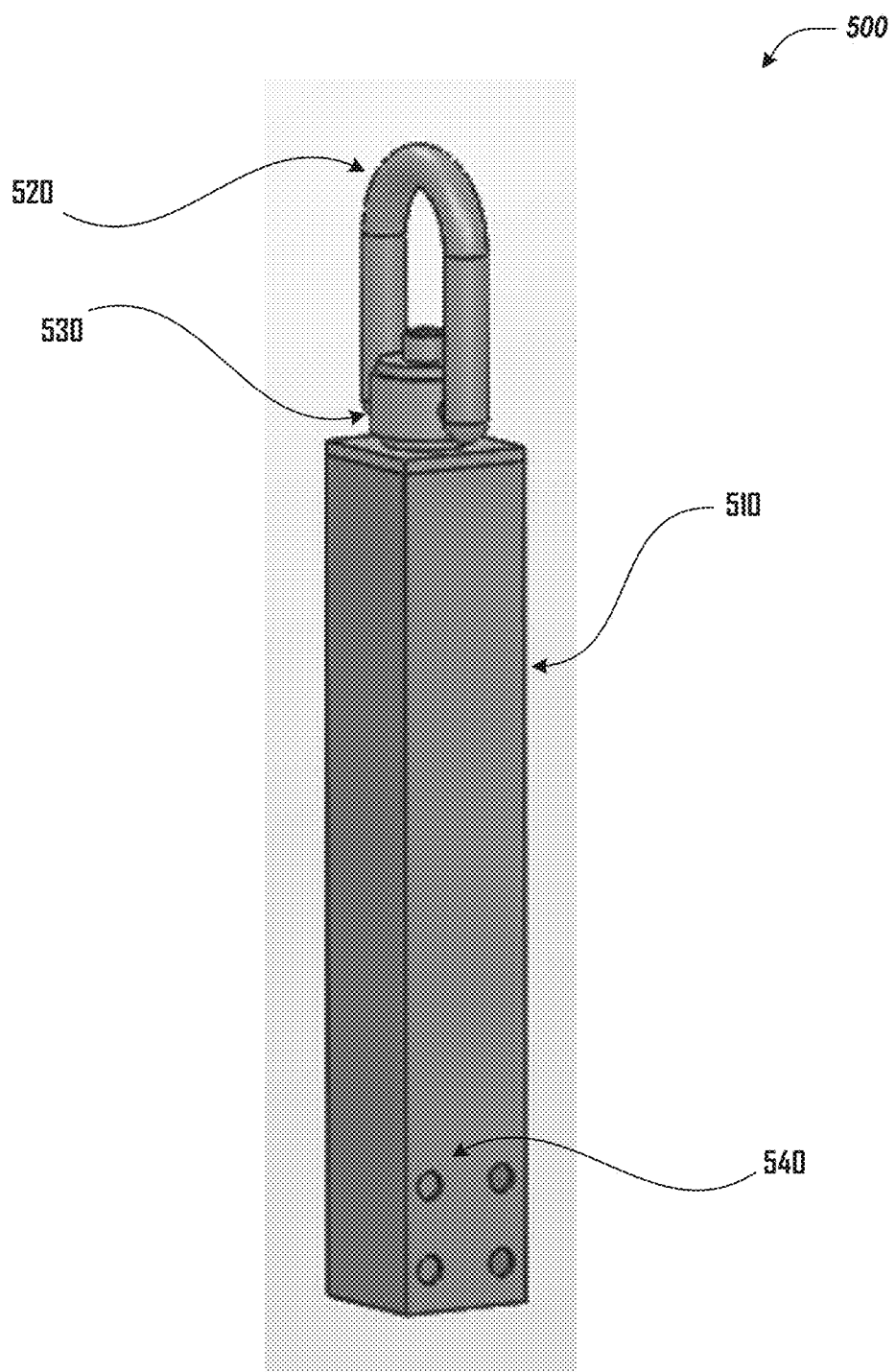
FIG. 5 illustrates a central structural member of a suspended load stability system in accordance with one embodiment.

FIG. 5 view 500 illustrates a central structural member 510 of the suspended load stability system 410 in accordance with one embodiment. The structural member 510 acts as the main tensile beam that carries the load. Therefore it should be constructed as strong as the cable to which it is attached, sufficient to bear the load to be stabilized by the LSS. In various embodiments, the main beam structural member 510 may be constructed of aluminum, steel, or carbon fiber-reinforced plastic, depending on the strength required and the types of loading expected to be encountered. For example, because carbon fiber is a non-isotropic material and on top of tensile loading, sling loads can produce quick, strong impulses that may be off-axis, aluminum or steel would be more appropriate for that application.

At the top of the structural member 510 is a hoist ring 520. The hoist ring 520 can be machined into a full single unit as part of the structural member 510, or can also be bolted to the top of the structural member 510. The hoist ring 520 enables the structural member 510 of the LSS to be attached to an object, e.g., a cable, wire, or rope for suspending a load. For example, the hoist ring 520 may be hooked on the end of a hoist strap or cable from a crane, boom, helicopter, or other lifting apparatus. In some embodiments, the hoist ring is a hook or other attachment mechanism as appropriate.

A rotating bearing 530 allows the hoist ring 520 to spin freely under load. The bearing 530 may include, e.g., a ball bearing interface. The rotating bearing 530 on the hoist ring 520 decouples rotational energy from the twisting or wind-up of the hoisting cable from the LSS and the external load. This allows the LSS to turn beneath the lifting cable without being affected by any twist in the cable, so that the LSS can orient itself (e.g., maintaining or changing orientation) to any direction necessary to stabilize the load. This also reduces twisting moments from the cable from being applied to the load.

In the illustrated embodiment, at the bottom of the structural member 510 is provided with attachment means 540 such as bolting holes for attaching one or more different sleeve options, as illustrated below with reference to FIGS. 6A-6B and 7A-7B.

In some embodiments, instead of a central structural member to which a cable hooks, the load stability system provides a cable attachment mechanism for latching to or around the cable. For example, the load stability system can include a groove or slot for locating the cable and a lever mechanism for retaining or fastening to the cable. By applying force to opposing sides of the cable, the load stability system can be securely mounted to the cable above the load. In some embodiments, such a clamp-on system contains wheels that provide pressure opposite a hard surface, allowing for a pressure clamp. In some embodiments, the wheels can rotate when clamped, allowing the system to ascend or descend the cable.

In embodiments with a cable attachment mechanism for attaching the load stability system to a position along the cable, the cable supports the load directly and the LSS is not mounted between the end of the cable and the top of the load. The LSS is then supported on the cable, so that the LSS does not bear the weight of the load. Embodiments employing such a cable attachment mechanism accordingly do not require a tensile beam through the center of the load stability system apparatus. Additional rotary permitting elements may allow the load stability system to freely rotate around the cable, such as by rotating around the mechanism attached to the cable.

The clamp-on cable attachment mechanism provides a simple interface to existing operating hoist systems and external load systems, and does not require direct interference with the cable being used to suspend the load.

Implementation details of such a cable attachment mechanism are further described in provisional U.S. Patent Application No. 62/627,920, filed Feb. 8, 2018, titled "SUSPENDED LOAD STABILITY SYSTEM THROUGH SELF POWERED AUTOMATED ELECTRIC DUCT FAN CONTROL," which is incorporated herein by reference.

Returning to the illustrations, FIGS. 6A-6B illustrate two alternative main beam sleeves that connect to the central structural member 510 for attaching a load in accordance with one embodiment. FIG. 6A illustrates a perspective view 600 of a main beam sleeve 610 including a load hook 630 and four bow or D-ring shackles 640. The shackles 640 are each mounted to a shackle mount 645 secured to the main beam sleeve 610. The load hook 630 is attached to the main beam sleeve 610 by an adapter plate 635. The load hook 630 may be an automatic (e.g., electronically) controlled release hook, or auto-hook, such as one or more remotely activated hooks that are remotely controllable from the cockpit of the aircraft or crane cabin with a button's push. The hook or hooks may permit rotation about the pivot point or restrict the rotation of the suspended object.

FIG. 6B illustrates a perspective view 650 of a main beam sleeve 660 also including a load hook 630 and four bow or D-ring shackles 640. Main beam sleeve 660 also includes four projecting I-beams 670 that are welded or otherwise secured to the sleeve 660, and to which the shackle mounts 645 are mounted.

Figures 7A, 7B:
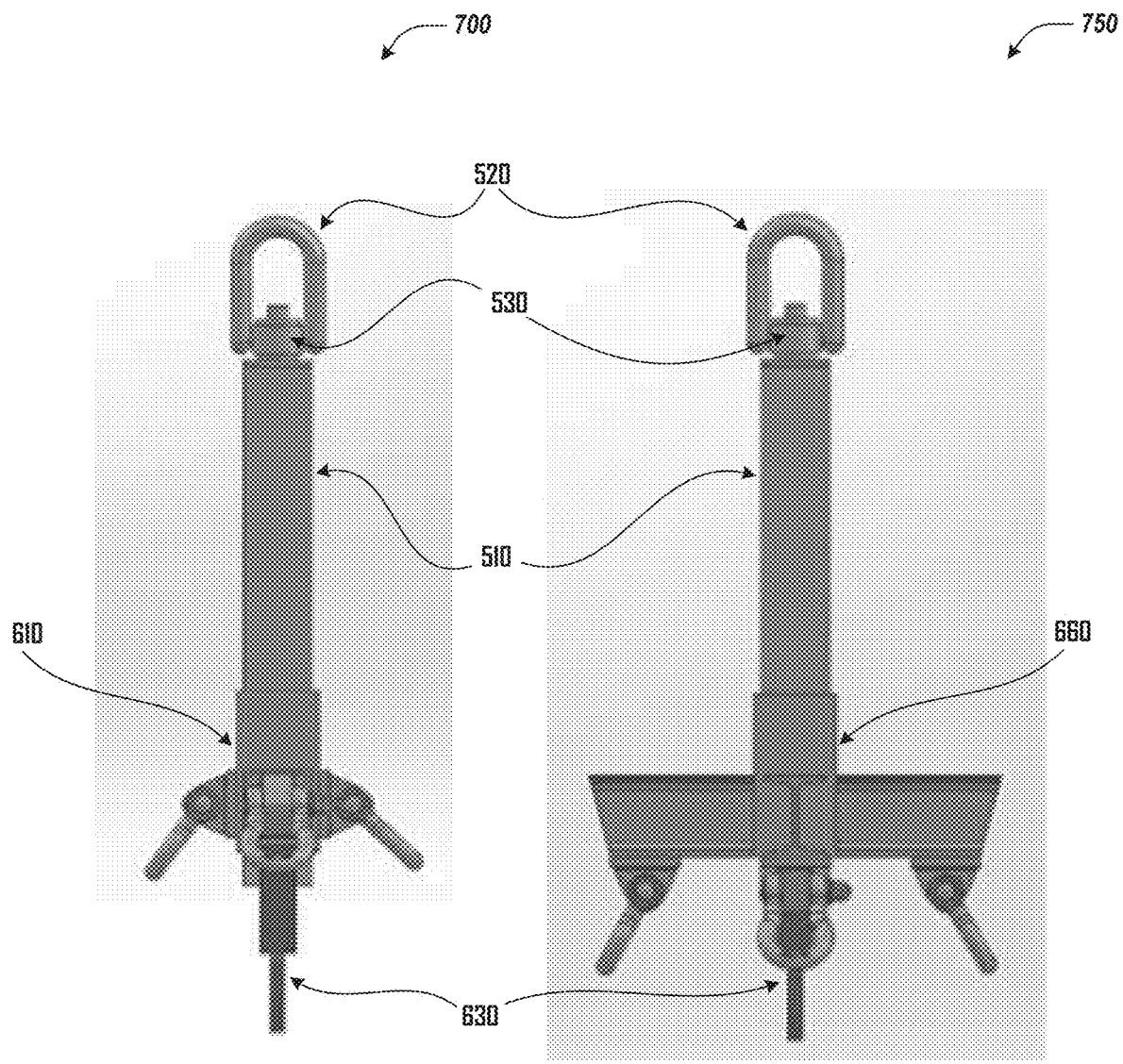
FIGS. 7A-7B illustrate the central structural member attached to each of the two alternative sleeves for attaching a load in accordance with one embodiment.

FIGS. 7A-7B illustrate side views 700 and 750, respectively, of the central structural member 510 attached to each of the two alternative main beam sleeves 610 and 660, respectively, for attaching a load in accordance with one embodiment. FIGS. 7A and 7B show the hoist ring 520 mounted on its rotating bearing 530 at the top of the structural member 510, and the load hook 630 at the bottom of the structural member 510. In the illustrated embodiments, the LSS main beam connects to the load by the load hook 630. In various embodiments, the bottom connection can be a bottom hoist ring or another attachment mechanism used in, e.g., current day flight operations.

In some embodiments, the LSS provides an interface for suspended loads that couples the motion of the LSS and the suspended load. That is, in the illustrated embodiments, the load hook 630 is configured not to turn or spin independently of the main beam structural member 510; the load is rotationally locked to the LSS. In some embodiments, the LSS load hook interface includes a rotatable fitting similar to the rotating bearing 530 of the hoist ring 520 at the opposite end of the main beam structural member 510, so that the LSS can turn without needing to rotate the load beneath the LSS.

FIG. 8 illustrates a perspective view 800 of a structural framework 810 of a suspended load stability system 410 in accordance with one embodiment. Like the preceding Figures, FIG. 8 shows the main beam structural member 510 with a hoist ring 520 and rotating bearing 530 on top, and with a main beam sleeve 610 including shackles 640 and a hook adapter plate 635 at the bottom. The framework 810 connected to the structural member 510 includes a pair of oval-profile ribs 820 that support horizontal spars 825. The horizontal spars 825 are formed of hollow tubes, and may be, e.g., carbon fiber.

The horizontal spars 825 in turn are connected to thruster mounting ribs 830 set in parallel with the ribs 820. The thruster mounting ribs 830 include, at their top and bottom extremities, thruster attachment mechanism points 840 for attaching thrusters to the framework 810. In addition, the thruster mounting ribs 830 are configured with a central opening to accommodate a power supply such as a battery in a battery tray 850.

Figure 9:
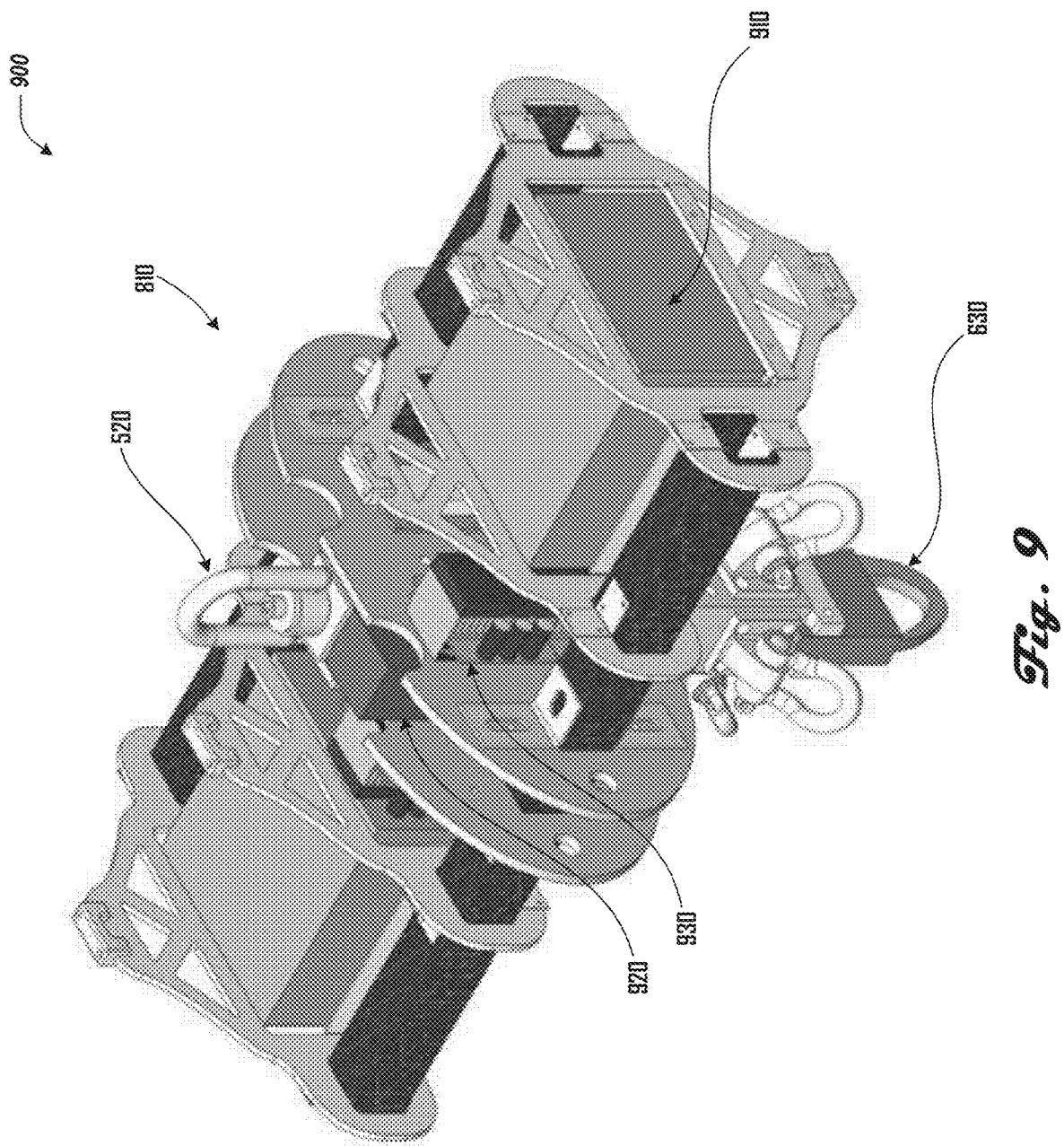
FIG. 9 illustrates a perspective view of components mounted in the structural framework of a suspended load stability system in accordance with one embodiment.

FIG. 9 illustrates a perspective view 900 of components mounted in the structural framework 810 of a suspended load stability system 410 in accordance with one embodiment. In the illustrated embodiment, the battery tray 850 of FIG. 8 is filled with a power supply such as a battery 910. The power supply may be a single power brick or an array of battery cells wired in series and/or in parallel, such as lithium-polymer (LiPo) cells. The batteries 910 can be removed from the battery tray 850 for easy inspection. The batteries can be charged while installed in the LSS (i.e., without having to remove them) via nodes on LSS 410 that connect to a charging dock. A data link allows a microcontroller unit or processor to monitor power information including (but not limited to) cell voltage and real-time power dissipation or consumption.

In addition, an auxiliary battery 920 is attached to the main beam. The auxiliary battery 920 allows, e.g., a steady supply of power to the processor even if the thrusters draw an excessive amount of power from the main batteries 910.

Thruster controller 930 allows the processor to control the speed, power draw, and thrust of the thrusters. The thruster controller 930 may be, e.g., an electronic speed controller ("ESC") for an electric ducted fan ("EDF"). An ESC typically has at least three connections: to the power supply, to a thruster, and to the processor or a microcontroller, or both. The ESC pulls power from the power supply and allocates it to the thrusters to control the amount of power that should be pushed to the thrusters.

FIG. 10 illustrates a perspective view 1000 of components of a suspended load stability system 410 mounted in the structural framework 810 in accordance with one embodiment. A processor 1010 or central processing unit (CPU) is centrally mounted within the framework 810 in the illustrated embodiment.

The processor 1010 may be an embedded system including a signal board computer and one or more microcontroller units ("MCUs"). The CPU and MCUs are contained within, e.g., a literal black box where all data link connections are made. The black box is a rugged plastic or polymer, protecting the system from environmental and operational factors such as weather and other operational conditions. In some embodiments, the CPU and MCUs are mounted to the same printed circuit board (PCB).

Also mounted within the framework 810 is a wireless transceiver 1020, which may form a separate transmitter and receiver, as well as an antenna for wireless communication. The transceiver 1020 and/or wireless antenna may also be mounted to or printed on the same printed circuit board as the processor 1010.

In the embodiment illustrated in FIG. 10, a vector navigation unit 1030 includes an inertial measurement unit ("IMU"). The IMU provides inertial navigation data to the processor 1010, and is centrally mounted within the framework 810 next to the processor 1010.

Some embodiments of a load stability system are modular. For example, the LSS may be divided into a center module and thrusters or thruster arm assemblies. FIG. 11A illustrates a perspective view 1100 of an alternative center module design 1100 of a suspended load stability system in accordance with one embodiment. The LSS center module 1110 may be configured with a minimum of 2 LSS thruster arms (such as the thruster arms illustrated in FIG. 12D, below), and a maximum of 4 to achieve the desired vectored thrust. Like other LSS embodiments, the system 1110 is self-powered and completely wireless with communication access points for Bluetooth, Wi-Fi, and/or radio frequency (RF) transmission and reception.

FIG. 11B illustrates a front view 1150 of another alternative center module design of a suspended load stability system 1160 in accordance with one embodiment. The LSS center module 1160 contains an emergency shut off mechanism including an emergency shut off pin 1170. The pin 1170 may be connected to a line. The pin 1170 can then be pulled to cause an emergency shut down of the LSS. Internally within the center module, a shutdown pin presence sensor senses the position of the pin 1170 to determine whether it is present or not. The system 1160 can only operate when the pin 1170 is present. If the pin 1170 is not present, the system 1160 will not activate. The pin 1170 can be reinstalled by placing it back into the pin hole.

FIG. 12A illustrates a perspective view 1200 of a thruster 1210 configured for use in a suspended load stability system in accordance with one embodiment. The LSS includes thrusters 1210 connected to the center module. These thrusters 1210 push fluid such as air, water, or gas in a direction to enable movement. For example, a thruster 1210 can include a ducted fan containing an electric motor that turns rotor blades. The rotor blades are contained within an aerodynamic shroud or duct through which fluid is pushed. In the case of a fan, the fluid is air pushed past the rotor blades, causing thrust.

The air is captured through an inlet at the front of the system. In some embodiments, the blades of the thruster 1210 can spin both ways, making the thruster bidirectional. Like other means of propelling fluid, bidirectional thrusters can push air in both the forward and aft directions. In various embodiments, fins molded into the casing of the thrusters help to generate optimal vectored airflow orthogonal to the blade cross-section, i.e., in the fore-and-aft direction of the thruster 1210.

FIG. 12B illustrates a perspective view 1225 of a two-thruster propulsion arm 1230 of a suspended load stability system in accordance with one embodiment. The propulsion arm 1230 is compatible with, for example, the LSS center module 1160 of FIG. 11B above or the load stability system 260 of FIG. 2B above. Some thrusters are more efficient in generating thrust in a forward direction than aft. Therefore fans can be oriented with opposing primary thrust vectors as illustrated in propulsion arm 1230.

In the illustrated embodiment, the LSS has the ability to be broken down into modular units. The thrusters 1210 can disconnect from the arms 1230 for easy storage and the arms 1230 can disconnect from the center module 1160. For example, a push button release pin and an electrical interface enables each of the thrusters and arm combinations to be released and disconnected from the center module 1160.

FIG. 12C illustrates a perspective view 1250 of a support member for a two-thruster propulsion arm 1260 of a suspended load stability system in accordance with one embodiment. The illustrated support member connects around a thruster 1210 and enables the thruster 1210 to connect to the center module 1260. A similar support member that wraps around a thruster 1210 is illustrated in FIG. 3 above.

FIG. 12D illustrates an isometric view 1275 of another two-thruster propulsion arm 1280 of a suspended load stability system in accordance with one embodiment. The propulsion arm 1280 is compatible with, for example, the LSS center module 1110 of FIG. 11A above. The propulsion arm 1280 is configured to fold to simplify storage and deployment. In the deployed state, the propulsion arm 1280 is parallel with the horizontal plane of the LSS center module 1110. The arm is capable of being deployed from 0-90 degrees through, e.g., manual, spring-loaded, or motorized interfaces.

Figure 13A:
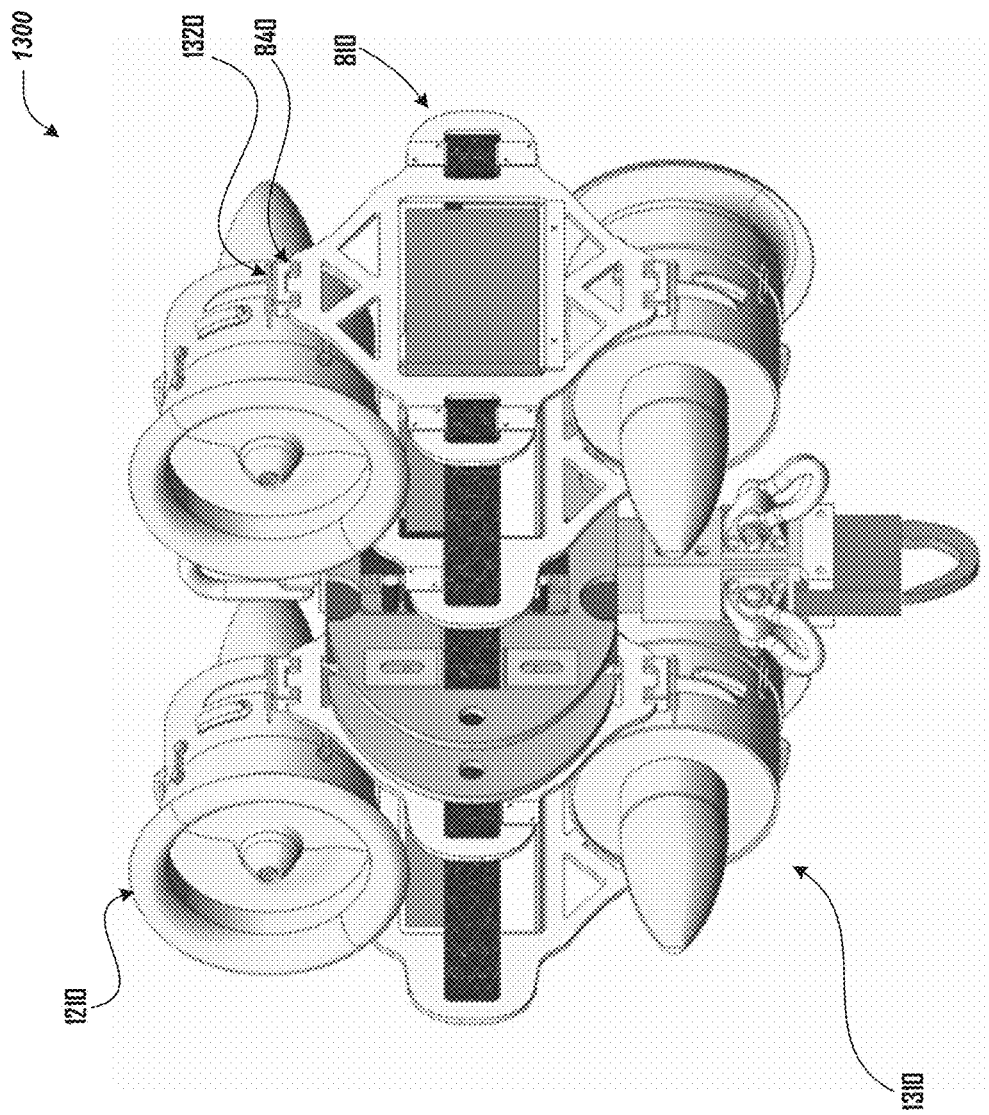

FIGS. 13A-13C illustrate perspective, front, and side views of thrusters mounted in the structural framework of a suspended load stability system in accordance with one embodiment. FIG. 13A illustrates perspective view 1300, FIG. 13B illustrates front view 1350, and FIG. 13C illustrates side view 1375. In various embodiments, the thruster 1210 includes a mechanism 1320 for connecting to the thruster attachment mechanism points 840 on the ribs 830. In some embodiments, the thrusters 1210 can be attached and removed toollessly. In some embodiments, on the outside of a thruster 1210, there are threaded holes at opposing locations symmetrical to the center of gravity of the fan shroud to which propulsion arms can securely bolt to the thruster 1210.

Thrusters can be connected by a series of wires bundled into a single cable. The wires end with a connector such as but not limited to, multipole ruggedized connector such as an EC5. The female connecting side is on the LSS center module, e.g., at the thruster attachment mechanism points 840 on the ribs 830, while the male is on the thruster 1210 side, e.g., associated with the mechanism 1320 or near the end of an LSS propulsion arm.

Figure 14:
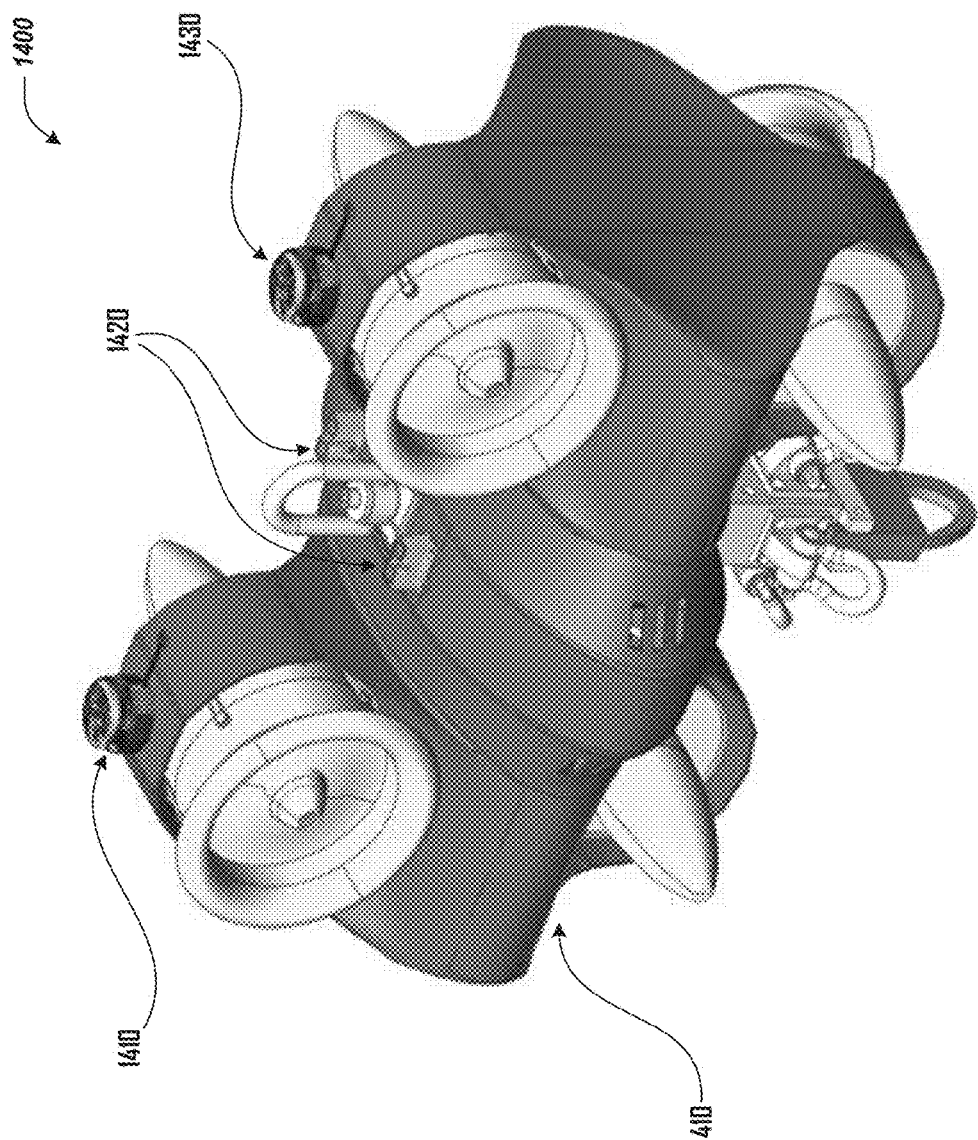
FIG. 14 illustrates a perspective view of a suspended load stability system including sensors mounted on an aerodynamic housing in accordance with one embodiment.

FIG. 14 illustrates a perspective view 1400 of a suspended load stability system 410 including sensors mounted on the aerodynamic housing 420 in accordance with one embodiment. The LSS sensor array may comprise an inertial measurement system, an orientation measurement system, and an absolute position measurement system. The inertial measurement system ("IMS") may include 3 degrees of freedom (3DOF) accelerometers, gyroscopes, and gravitational sensors, which may be microelectromechanical systems (MEMS) sensors. The orientation measurement system may include a magnometer or magnetometer such as a compass, an inclinometer, a directional encoder, and a radio frequency relative bearing system. The absolute position measurement system may include global positioning system (GPS) sensors 1430.

The sensor array may further comprise a proximity sensor or light detection and ranging (LIDAR) system 1410 (e.g., rotating or linear), and/or an optical sensor 1420 such as one or more cameras or infrared (IR) sensors. Proximity sensors may include ground height sensors. Optical sensors can be placed on all sides of the shell facing all directions. Optical sensors can also provide visual information to the user. This information is communicated by the LSS processor, via a data link cable and/or the wireless transceiver. Proximity and optical sensors allow the system to be capable of 360 degree awareness and collision avoidance by detecting obstacles (e.g., a portion of a tree canopy) and altering the course of the LSS to avoid the obstacles. The system is also capable of feeding back ground (or water) position data to aircraft pilot and crew.

Additional LSS sensors may include a strain sensor to gauge load on the central structural member 510, a rotational encoder or thruster 1210 speed sensor which may be incremental or absolute, and a shutdown pin 1170 presence sensor.

The LSS can use remote positional sensors or beacons, remote computational units, or target node transceiver devices to assist in characterizing the motion of the suspending platform (e.g., a helicopter ownship), the LSS and the suspended load, and a target location of interest such as a person to rescue or a load destination.

The LSS processor 1010 applies algorithms to received sensor system data to yield a desired system response. For example, the GPS sensor may be refined through real-time kinetic (RTK) algorithms to refine absolute position. The measurements are fused together through non-linear data fusion methods such as Kalman filtration methods to yield optimal state estimates in all degrees of freedom to accurately characterize the system's location and motion in the geodetic space.

Figure 15:
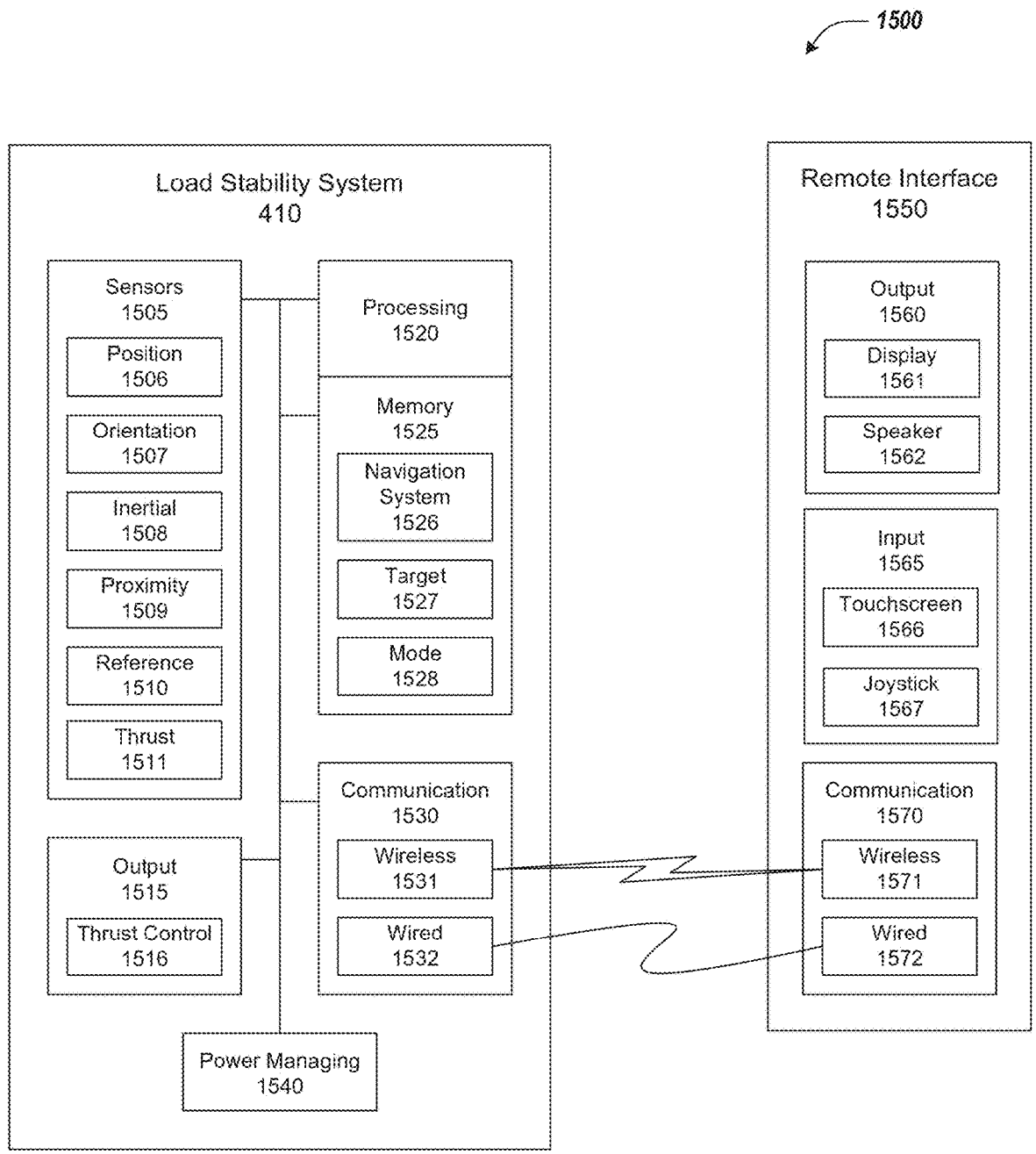
FIG. 15 schematically illustrates operational components of a suspended load stability system including a remote interface in accordance with one embodiment.

FIG. 15 schematically illustrates operational components of a suspended load stability system 410 including a remote interface 1550 in accordance with one embodiment. Within the LSS system 410 are a sensor suite 1505, which can include position sensors 1506, orientation sensors 1507, inertial sensors 1508, proximity sensors 1509, reference location sensors 1510, and thrust sensors 1511. The LSS processing capacity 1520 includes the processor 1010 and microcontrollers. LSS memory 1525 generally comprises a random access memory ("RAM") and permanent non-transitory mass storage device, such as a solid-state drive, and contains navigation systems 1526, target data 1527, and mode or command state information 1528. Communication systems 1530 include wireless systems 1531 such as the wireless transceiver 1020, and wired systems 1532. LSS output 1515 includes thrust control 1516 via the thruster controllers 930. Power managing systems 1540 regulate and distribute the power supply from, e.g., the batteries 910. A data bus connects the various internal systems and logical components of the LSS.

An interactive display or remote interface 1550 is a computational unit that can be self-powered or hardwired into an airframe. The interactive display 1550 receives data from the LSS, e.g., wirelessly. The data from the LSS is displayed on the interactive display 1550; the computational data is parsed and converted to visual cues. The interactive display also communicates to the LSS the operator's desired command states as discussed below.

The interactive display or remote interface 1550 is in communication with the LSS 410 via communication systems 1570, which may be wireless 1571 or wired 1572. Output 1560 from the remote interface 1550 may include information displayed on a screen 1561 and audio cues 1562. Input 1565 to the remote interface 1550 to control the LSS may include commands through a touchscreen 1566 or a joystick 1567. In various embodiments, the remote interface 1550 may comprise one or more physical and/or logical devices that collectively provide the functionalities described herein.

Aspects of the system can be embodied in a specialized or special purpose computing device or data processor that is specifically programmed, configured, or constructed to perform one or more of the computer-executable instructions explained in detail herein. Aspects of the system can also be practiced in distributed computing environments where tasks or modules are performed by remote processing devices that are linked through a communications network, such as a local area network (LAN), wide area network (WAN), or the Internet. In a distributed computing environment, modules can be located in both local and remote memory storage devices. As schematically illustrated in FIG. 15, load stability system 410 and remote display interface 1550 are connected by a wired or wireless network.

FIG. 16 illustrates a perspective view 1600 of a remote positional unit or target node of a suspended load stability system in accordance with one embodiment. The remote positional unit or target node comprises an external sensor suite or beacon that is configured to communicate wirelessly with the LSS as a positional reference. If the LSS is considered the primary sensor suite, a secondary sensor suite location can be the platform from which the cable is suspended, and a tertiary sensor suite location can be a location of interest for the load (e.g., for positioning to obtain or deliver the load).

A remote positional unit can include a positional transceiver configured to communicate with the LSS via its wireless transceiver 1020 and provide a positional reference. For example, a remote positional unit can be attached to a helicopter ownship or crane below which the load is suspended.

In some embodiments, the remote positional unit or target node is a black box made of durable polymer or plastic, large enough to fit into a hand, 1610. The box 1610 has an external antenna on the side or top of the box, 1620. The remote positional unit may be attached to, e.g., the helicopter by magnets, bolts, or any other attachment mechanism. The target node may be dropped to a location on the ground or attached to, e.g., a life preserver or other flotational device, a rescuer, a load to be picked up, a location for a load to be delivered, or an operational specific location.

FIG. 17 illustrates a perspective view 1700 of a charging station for a suspended load stability system in accordance with one embodiment. In some embodiments, the LSS can be stored and charged in a charging station in a stationary location or on board an airframe for ease and convenience. The charging station 1710 can run off available power sources such as power aboard a machine like a helicopter or off of generator power.

The charging station 1710 is a dockable station, meaning the LSS can connect and be placed within the charging station 1710 itself. In some embodiments, the docking station has two arms 1720, one on each side of the system; placing the LSS in between the arms until a clicking sound is observed locks the LSS in place. Upon appropriate placement, the LSS electrical contacts placed on the frame of the system will make contact with electrical contacts within the charging station; automatically starting an electric charge of the LSS. The LSS can be released via the push of a button on the side of the charging station, 1740.

To show the user the status of the charge, the charging system has a light indicating the status of the charge, 1730. On top of the charging station, the station has a power switch when operationally needed, 1750. Meanwhile, operators can also turn the charging station on/off and view the status of the charge via portable interactive displays 1550.

Figure 18:
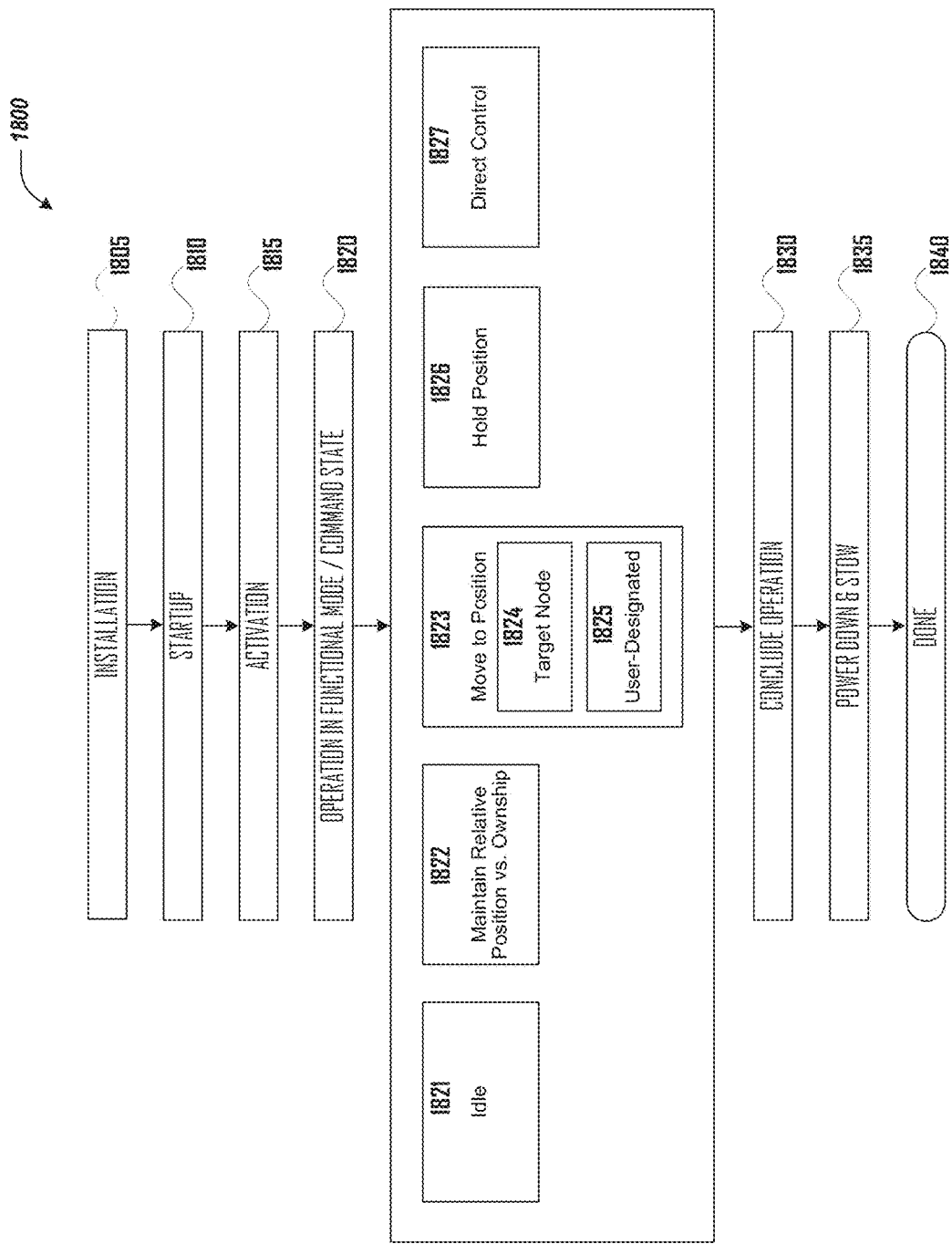
FIG. 18 illustrates an operational routine of a suspended load stability system including multiple modes or command states in accordance with one embodiment.

FIG. 18 illustrates an operational routine 1800 of a suspended load stability system including multiple modes or command states in accordance with one embodiment.

In block 1805, the load stability system apparatus is installed onto the cable from which the load will be suspended. The system need not be powered for installation.

In block 1810, the LSS is started up. In some embodiments, the system can be initialized by the press of a button located on the face of the center module of the LSS. Near the easily accessible external button that can initialize the system, another button may be present that allows for immediate system shut down when pressed. In addition to the initialization interface on the center module, the system can also be initialized by an operator not directly next to the system. One or more external operators, including but not limited to a rescuer on the end of the cable, can initialize the system by pressing a button on one or more interactive displays 1550 linked wirelessly to the LSS.

In block 1815, the LSS is activated, and proceeds to operation 1820 in one of the LSS functional modes or command states selected by the operator. The functional modes or command states of the system are:

Idle mode 1821: all internal systems of the LSS are operating (e.g., the LSS observes its motion and calculates corrective action), but the thrusters are shut off or maintain an idle speed only, without action to affect the motion of the load.

Maintain Relative Position vs. Ownship mode 1822: The LSS is stabilized with respect to the slung origin point. For example, when the LSS is suspended with a load below a helicopter, the LSS will stay directly below the helicopter. The LSS localizes the ownship motion and performs the corrective actions necessary to critically damp any other suspended load motion. If the ownship is traveling at a low speed, the LSS will couple the velocity so the two entities are moving in unison. Upon a disturbance to the load, the LSS provides thrust in the direction of the disturbance to counteract the disturbance, eliminating the swing.

Move to/stop at Position mode 1823: The LSS will stabilize to a fixed position, counteracting the influence of the weather or small movements of the helicopter or other suspending platform. This mode has the effect of killing all motion. The operator can send the desired target position to the LSS via the remote interface 1550. This can be accomplished in at least two ways:

Target node position 1824: The operator can place a LSS remote positional unit or target node 1610 at the desired lowering location (e.g., location 160 of FIG. 1). The target node 1610 will communicate wirelessly with the LSS to indicate the desired position, and the LSS responds by maneuvering to the desired location. The remote interface 1550 UI will receive and display the location information of both entities.

User-designated position 1825: The operator can use the remote interface 1550 UI to send a designated position (e.g., latitude and longitude coordinates) as a commanded location to the LSS. The system will then steadily direct the suspended load to the desired position. The system will simultaneously send feedback to the remote interface 1550 UI regarding position and distance information.

Hold Position mode 1826: The LSS will resist all motion and maintain its current position independent of the ownship's motion. This mode has the effect of killing all motion.

This mode has conditional responses respectively to ownship speed, safety factors, and physical constraints.

Direct Control mode 1827: Joystick operation of the LSS in three degrees of freedom. The operator is able to directly control positioning, rotation, and thruster output level. Though the LSS is entirely closed-loop and does not require external control during operation, there is an option for user control.

In block 1830, the operator completes the operation and retrieves the LSS.

In block 1835, the system can be shut down by pushing a button on the interactive display or by pressing the button on the center module itself. If the LSS includes collapsible propulsion arms, they can be folded up. The load is detached from the load hook 630, and then the suspended cable is detached from the hoist ring 520 at the top of the LSS. The LSS may then be stowed in its charger or any convenient location.

Figure 19:
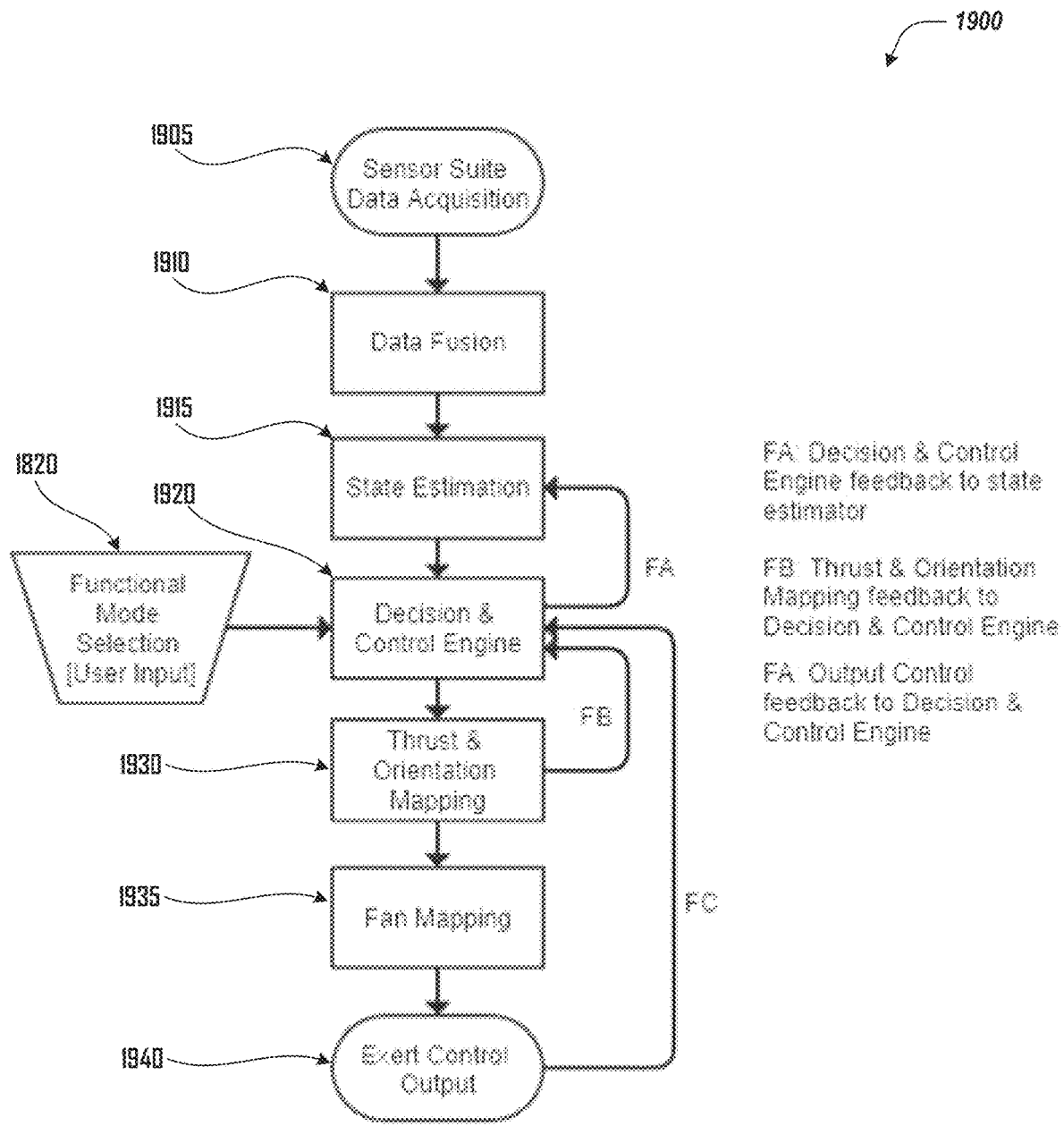
FIG. 19 illustrates a decision and control routine of a suspended load stability system in accordance with one embodiment.

FIG. 19 illustrates a decision and control routine 1900 of a suspended load stability system in accordance with one embodiment. The LSS operates in a closed loop to understand its position and motion in near real time, perform a set of calculations to determine the most desired system response, then send the desired response to the air propulsion system thruster array to mitigate swing of the cable during operations. This process is continuous as long as the system is powered.

The LSS top level control flow diagram 1900 starts in block 1905 with data acquisition from a plethora of sensors including (but not limited to) accelerometer, gyroscope, magnetometer, GPS, lidar/radar, machine vision, and/or range finders.

In block 1910, the LSS combines data from the sensors to obtain a data fusion describing its position, orientation, motion, and environment.

Sensor data is fused and filtered by the LSS through non-linear flavors of the Kalman Filter to yield an accurate representation of the system's state. Traditional closed-loop control methods including fuzzy-tuned proportional, integral, and derivative feedback controllers have bidirectional communication with advanced control methods including deep learning neural nets and future propagated Kalman filters, allowing for further real-time system identification.

In block 1915, the LSS performs state estimation using non-linear state estimators to project near-term future motion based on the data fusion and on feedback from the decision and control engine to the state estimator.

In block 1920, the LSS decision and control engine takes the state estimation 1915, informed by the user-selected functional mode or command state 1820, as well as additional feedback from the thrust and orientation mapping 1930 and output control 1940, and decides how the LSS should move or exert force.

The system algorithmic output is sent to motion controllers at which the desired thrust response will be sent to the electric duct fans via phase control. The net thrust output is mapped in real-time through encoders and load cells then sent back to the Host and Controllers for closed-loop control.

In block 1930, the LSS thrust and orientation mapping applies the LSS decision of how the LSS should move or exert force 1920 to determine a thrust and an orientation to apply the thrust to move or exert force as decided.

In block 1935, the fan mapping applies the determined thrust and orientation to apply the thrust to generate a fan mapping to control the thrusters 1210 to achieve the determined thrust and orientation of the LSS.

In block 1940, the LSS thrusters 1210 exert the commanded control output, implementing a dynamic response in the form of thrust counteracting unwanted motion.

The entire process is unmanned and automated aside from the high-level operator-selected functional control modes. The net output is a control force to stabilize a suspended load.

Status indicator lights may be mounted on various surfaces of the LSS to aid in visibility and operation of the LSS from above and below. For example, the LSS may have external lighting such as LEDs near the thrusters that identify the edges and orientation of the LSS. This allows for improved identification in hard viewing situations such as inclement weather. During operation, both on the interactive display and the system body itself the LED display indicators show that the system is active and convey useful information.

Figure 20:
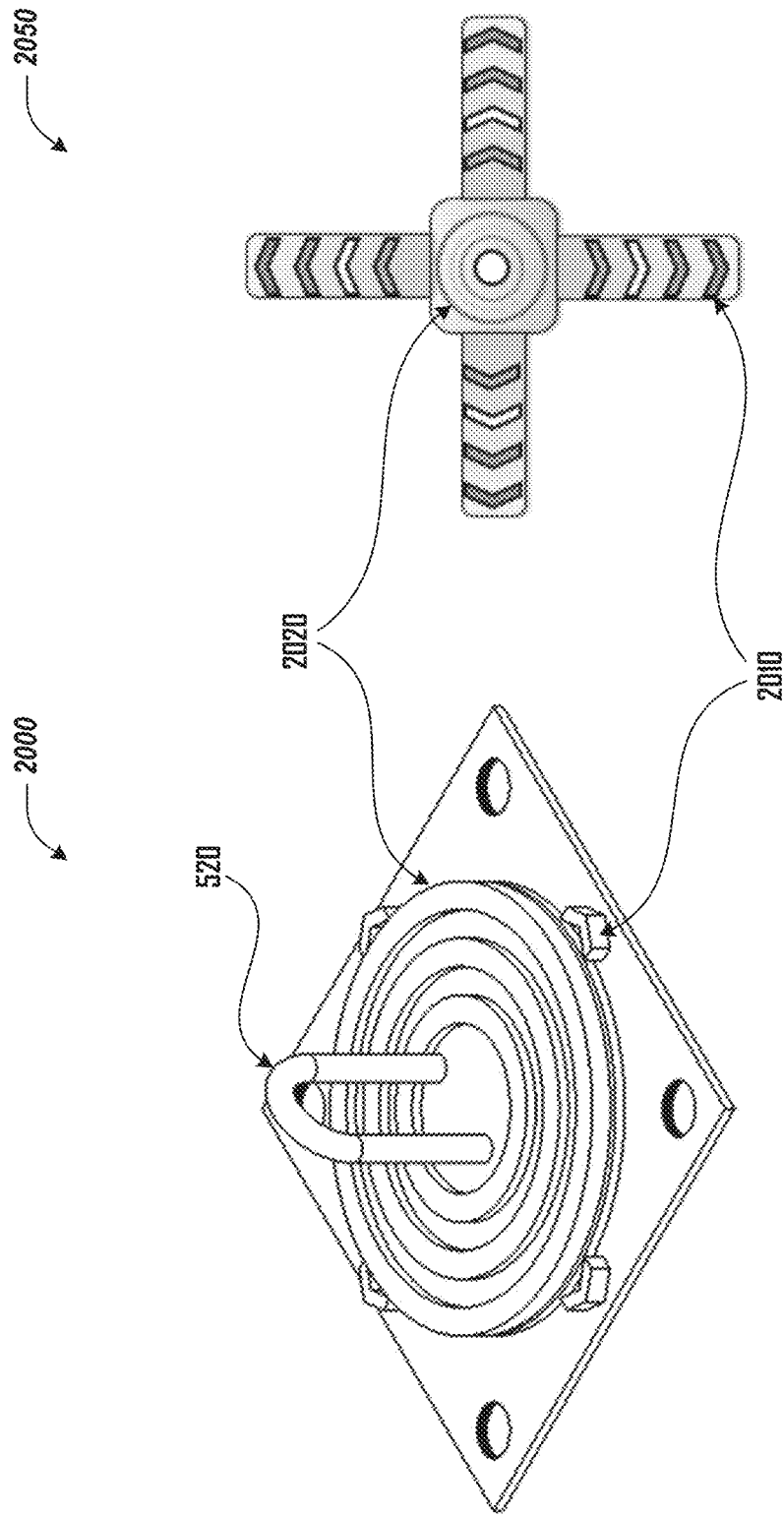
FIG. 20A illustrates a perspective view of a top cable ring with external status indicator lights of a suspended load stability system in accordance with one embodiment.
FIG. 20B illustrates a top view of status indicator lights of a suspended load stability system in accordance with one embodiment.

FIG. 20A illustrates a perspective view of a top cable ring with external status indicator lights of a suspended load stability system in accordance with one embodiment, and FIG. 20B illustrates a top view of status indicator lights of a suspended load stability system in accordance with one embodiment. On top of the LSS housing and around the hoist ring 520, lighted status indicators can represent varied types of information useful to an operator from the LSS.

In some embodiments, a status indicator light display can indicate LSS signal reception integrity. The LSS processor 1010 measures the signal strength and based on predetermined thresholds, changes the colors of the lights to indicate such strength.

Another status indicator may indicate the direction and amount of thrust that the system is exhibiting. In some embodiments, the arrows 2010 are color LEDs in which the innermost arrow pointing outward is green, the next is yellow, the third is orange, and the outer arrow is red. The LSS can light the arrow indicators 2010 to indicate the direction that the system is trying to move the load, and use the arrow color hierarchy to depict the system output. For example, a green indicator 2010 may indicate a 5%-25% system output level, yellow may indicate 25%-50%, orange 50%-75%, and red 75%-100%. A high output level also provides an indication to a platform operator such as a crane operator or aircraft pilot to move in the direction indicated by the arrows 2010 to reduce system output and maintain the desired load positioning.

The concentric center ring LEDs 2020 may also include colors, such as a green inner ring, an orange middle ring, and a red outer ring. The circular LED rings 2020 can indicate height of the load above ground. For example, the green ring may indicate a height of more than 25 feet above ground, the orange ring may indicate a height of between 25 feet and 10 feet above ground, and the red ring may indicate a height of less than 10 feet above ground.

In various embodiments, external LSS status indicator lights can be configured to indicate one or more of a position of the LSS, an orientation of the LSS, a distance from obstacles, a height above ground, a signal quality of the wireless transceiver, a mode or command state of the LSS processor, an inertial behavior of the load, an energy capacity or available power of the power supply, a work load or power consumption of the thrusters, the thrust from each thruster, a motion or direction of thrust of the LSS, and a recommended direction for an operator to maneuver the platform suspending the load.

Figure 21:
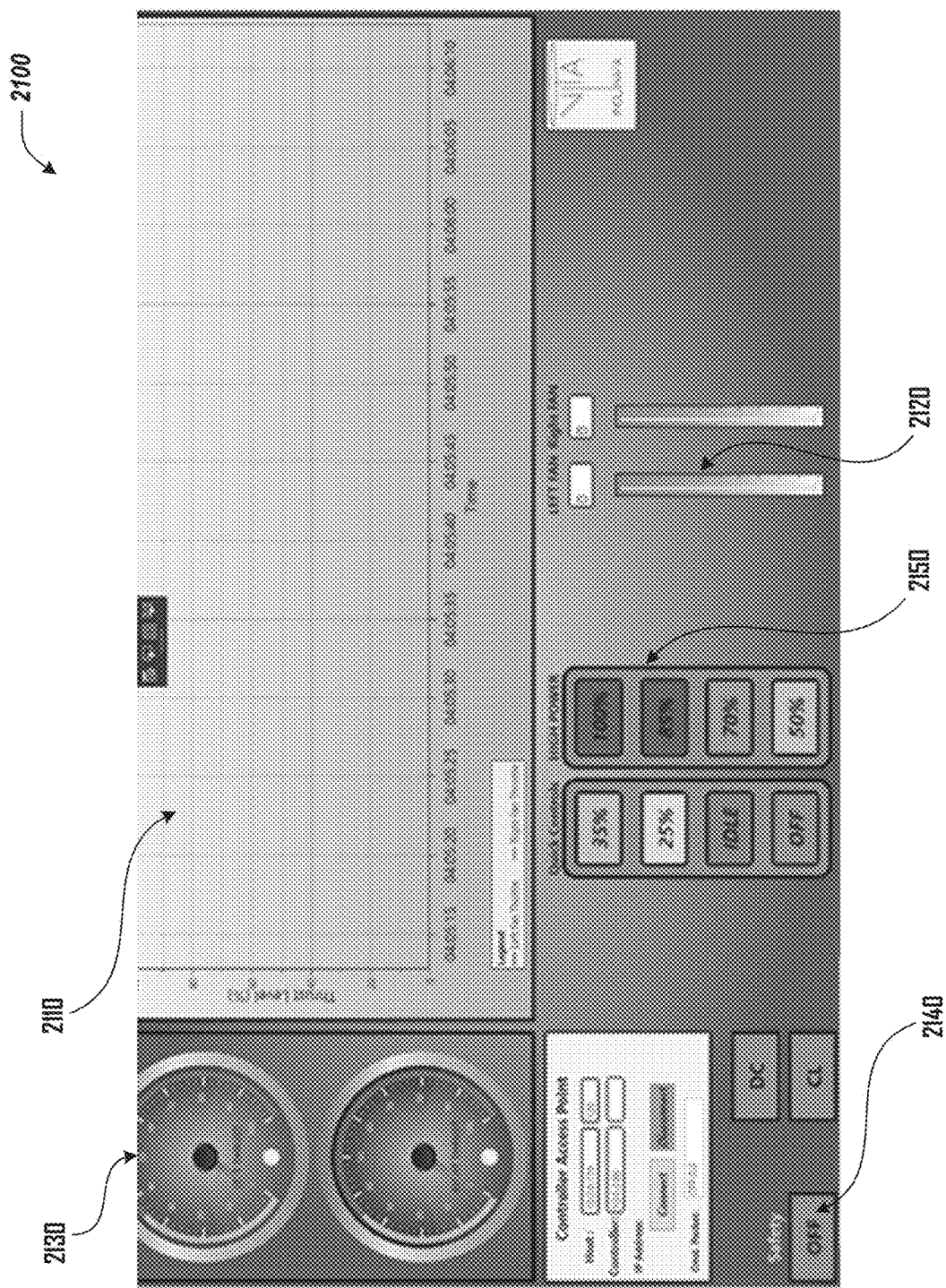
FIG. 21 illustrates a screenshot of a control interface for a suspended load stability system in accordance with one embodiment.

FIG. 21 illustrates a screenshot 2100 of a control interface for a suspended load stability system in accordance with one embodiment. The interactive display 1550 is a computational device in wireless communication with the LSS with a screen that displays indicators for the current state of the system and controls for the system. For example, the illustrated display screenshot includes a graph 2110 of thrust over time for each thruster 1210, and a readout of energy capacity 2120 and gauges for current fan thrust 2130. In various embodiments, the interactive display 1550 will also indicate the position of the LSS system relative to the location of the suspending platform and/or target node. The interactive display 1550 also provides load state feedback in the form of visual (and audible, where appropriate) indicators that describe the load's inertial behavior, suggested measures, and the system's work load in real time.

In various embodiments, the interactive display 1550 contains different buttons that indicate and select different functional modes or command states of the system, as described above with reference to FIG. 18. Should the operator not be in reach of the LSS, the operator can also initialize the LSS via the interactive display 1550. The control interface 2100 also includes an emergency shut off mechanism 2140 in the form of a bright red "OFF" switch.

Figure 22:
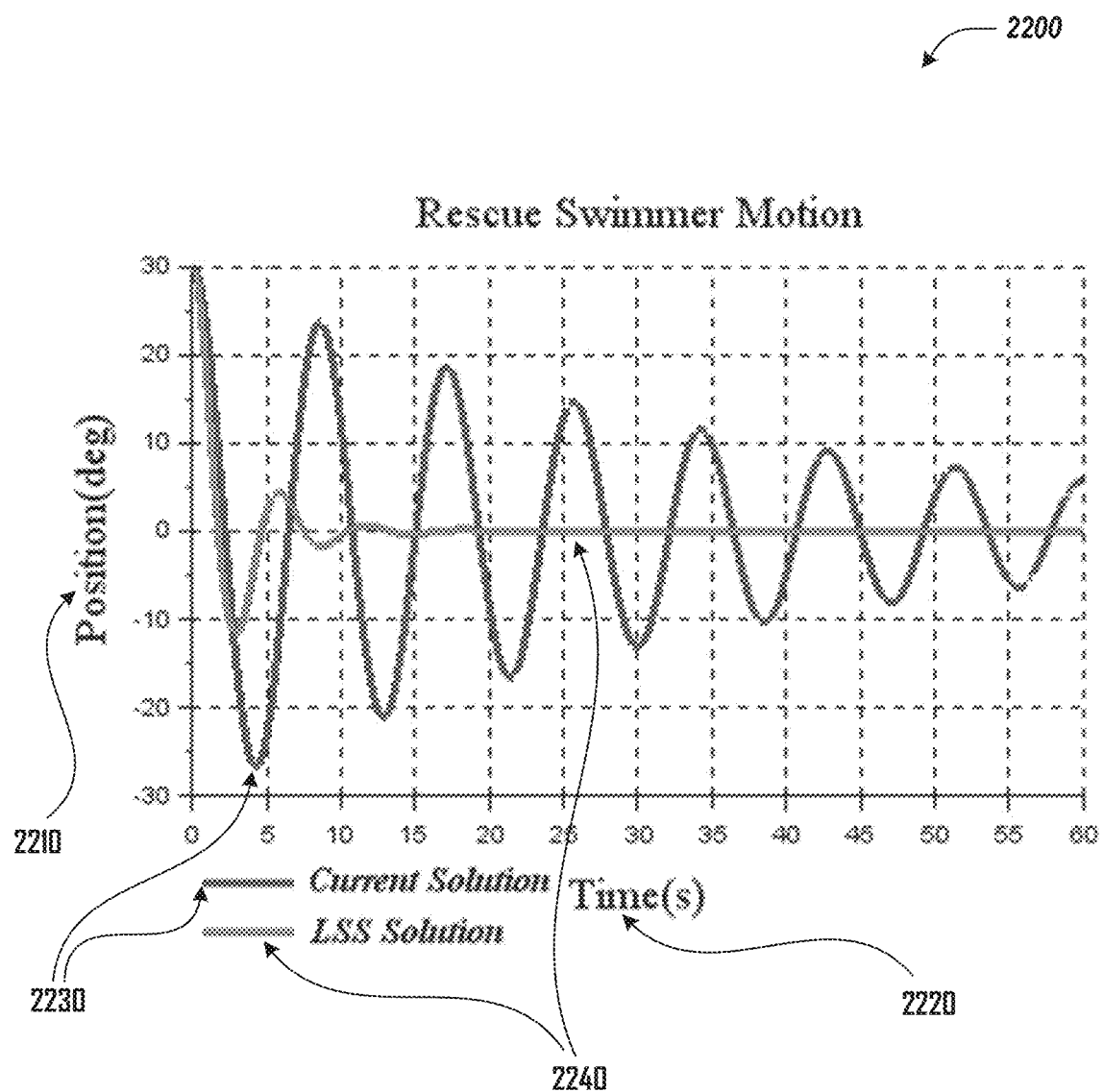
FIG. 22 illustrates a graph plotting the motion of a swinging load and the motion of a load stabilized by a suspended load stability system.

FIG. 22 illustrates a graph 2200 plotting the motion of a swinging load 2230 and the motion of a load stabilized 2240 by a suspended load stability system. On the Y axis, the graph plots angular position (in degrees) of a load 2210, in this case representing a rescue swimmer swinging beneath a helicopter. On the X axis, the graph plots time elapsed (in seconds) 2220 from an initial 30 degree swing, an exceptionally large disturbance due to turbulent winds, while a fully-geared rescue swimmer weighing 100 kg is being lowered onto a boat. Such a large swing from the vertical axis is an exceptionally dangerous situation for the swimmer, the ownship crew, and the people in need on the boat.

Without the LSS, the pilot would gradually regain control of the suspended swimmer 2230, but would continue to sway for an extended time and might ultimately catch or hit the boat's railings and fall to the deck. In contrast, with the LSS, the swimmer is quickly returned to a quiet vertical position beneath the ownship. The LSS dampens the 30 degree oscillating motion to less than one degree in under ten seconds. Incorporating the LSS into such an operation reduces helicopter hovering time and allows the crew chief to safely lower the swimmer onto the boat, ultimately decreasing the operation's risk and duration.

The load stability systems described herein control the pendulum-like motion of an external load attached to a cable through a dynamic air propulsion system to eliminate lateral sway and rotational swinging. The LSS is agnostic to the type of platform from which it is suspended. It characterizes the necessary flight dynamics to perform corrective measures on a suspended loads of all kinds. It is adaptable to external loads, sling loads, and rescue hoist operations, among many other applications that can benefit from a self-contained, self-powered, closed-loop stabilization system that counteracts the pendulum swing of any suspended load.

Although specific embodiments have been illustrated and described herein, it will be appreciated by those of ordinary skill in the art that alternate and/or equivalent implementations may be substituted for the specific embodiments shown and described without departing from the scope of the present disclosure. For example, although various embodiments are described above in terms of a helicopter ownship, in other embodiments an LSS may be employed under a construction crane or gantry. This application is intended to cover any adaptations or variations of the embodiments discussed herein.

What is claimed is:

1. A load stability system apparatus for stabilizing a load suspended via a cable from above, the apparatus comprising:
   a center module comprising:
      an attachment point for the cable, configured to allow rotation of the cable relative to the apparatus such that a twist or rotational motion of the cable is decoupled from an orientation of the apparatus and the apparatus in operation is orientable to any direction around an upright axis between the cable and the load;
      an attachment point for the load, configured to suspend the load in operation below the load stability system apparatus;
      a tensile structural element along the upright axis between the attachment point for the cable and the attachment point for the load,
         wherein an upper surface of the tensile structural element is coupled to the attachment point for the cable and a lower surface of the tensile structural element is coupled to the attachment point for the load; and
      a thruster mounting structure connected to the tensile structural element, configured to mount an even number of thrusters to the center module in a fixed position,
         wherein the fixed position comprises pairs of thrusters arranged on opposite sides of the center module across the upright axis, aligned in parallel and facing a common direction;
   a power supply;
   a sensor array comprising:
      an inertial measurement system;
      an orientation measurement system; and
      an absolute position measurement system;
   a wireless transceiver;
   a thruster controller;
   two or more thrusters connected to the thruster mounting structure and controlled by the thruster controller; and
   a processor operably connected to the sensor array, the wireless transceiver, and the thruster controller;
   wherein the processor is configured to:
      determine a motion of the load, the motion including any of a pendulum awing, a conical pendulum swing, and a twisting or rotational motion, based on the sensor array measurement systems;
      orient the apparatus to a thrust application vector, by controlling thrust provided by the at least one of the thrusters in the pairs of thrusters mounted on opposite sides of the center module, such that the common direction that at least one of the pairs of thrusters faces coincides with the thrust application vector; and
      apply thrust along the thrust application vector to autonomously counteract the motion of the load, by controlling at least the pair of thrusters aligned with the thrust application vector.

2. The load stability system apparatus of claim 1, wherein the two or more thrusters comprise unidirectional or bidirectional ducted fans.

3. The load stability system apparatus of claim 1, further comprising a thruster mount mechanism wherein the two or more thrusters are toollessly detachable from the center module.

4. The load stability system apparatus of claim 1, wherein the attachment point for the cable comprises one or more of a hoist ring or a hook.

5. The load stability system apparatus of claim 1, wherein the power supply comprises one or more batteries.

6. The load stability system apparatus of claim 5, further comprising a charging station configured to electrically connect to the apparatus to charge the one or more batteries and to physically receive and secure the apparatus.

7. The load stability system apparatus of claim 1, wherein the power supply comprises a wired power connection.

8. The load stability system apparatus of claim 1, further comprising a housing around the center module.

9. The load stability system apparatus of claim 1, wherein the sensor array inertial measurement system comprises at least one accelerometer or gyroscope, the sensor array orientation measurement system comprises at least one magnetometer or compass, and the sensor array absolute position measurement system comprises a Global Positioning System (GPS) sensor.

10. The load stability system apparatus of claim 1, wherein the sensor array further comprises at least one of a proximity sensor or light detection and ranging (LIDAR) system, an infrared (IR) or optical sensor, a gravitational sensor, a strain sensor, a rotational encoder or thruster speed sensor, or a shutdown pin presence sensor.

11. The load stability system apparatus of claim 1, further comprising a remote positional unit external to the apparatus, located at a position that is fixed relative to the location from which the cable is suspended or a target location, wherein the remote positional unit includes a positional transceiver configured to communicate with the wireless transceiver and provide a positional reference to the apparatus.

12. The load stability system apparatus of claim 1, further comprising external status indicator lights configured to indicate one or more of a position of the apparatus, an orientation of the apparatus, a distance from obstacles, a height above ground, a signal quality of the wireless transceiver, a mode or command state of the processor, an inertial behavior of the load, an energy capacity or available power of the power supply, a work load or power consumption of the two or more thrusters, the thrust from each thruster, a motion or direction of thrust of the apparatus, and a recommended direction for an operator to maneuver a platform suspending the load.

13. The load stability system apparatus of claim 1, further comprising a user-operable button or switch on the apparatus to initialize or shut down the apparatus and an emergency shutdown mechanism comprising a removable pin.

14. The load stability system apparatus of claim 1, further comprising a remote interactive display comprising a display processor, a screen, an input device, and a display transceiver configured to communicate with the wireless transceiver, wherein the remote interactive display is configured to:
receive data wirelessly from the load stability system apparatus via the display transceiver;
display, via the screen, indicators of one or more of a position of the apparatus, an orientation of the apparatus, a distance from obstacles, a height above ground, a signal quality of the wireless transceiver, a mode or command state of the processor, an inertial behavior of the load, an energy capacity or available power of the power supply, a work load or power consumption of the two or more thrusters, the thrust from each thruster, a motion or direction of thrust of the apparatus, and a recommended direction for an operator to maneuver a platform suspending the load; and
provide user control, via the input device, to set one or more of the mode or command state of the processor, a target position for the apparatus, and activation of an emergency shut off.

15. The load stability system apparatus of claim 1, wherein the apparatus comprises a self-contained, self-powered, closed-loop stabilization system that continuously counteracts a pendulum-like swing of the suspended load.

16. A method, performed by an autonomous load stability system apparatus suspended by a cable, to counteract a swinging of a load suspended below the load stability system apparatus,
wherein the load stability system apparatus includes a center module (comprising an attachment point for the cable, configured to allow rotation of the cable relative to the apparatus such that a twist or rotational motion of the cable is decoupled from an orientation of the apparatus and the apparatus in operation is orientable to any direction around an upright axis between the cable and the load, an attachment point for the load, configured to suspend the load in operation below the load stability system apparatus, a tensile structural element along the upright axis between the attachment point for the cable and the attachment point for the load, wherein an upper surface of the tensile structural element is coupled to the attachment point for the cable and a lower surface of the tensile structural element is coupled to the attachment point for the load, and a thruster mounting structure connected to the tensile structural element, configured to mount an even number of thrusters to the center module in a fixed position, wherein the fixed position comprises pairs of thrusters arranged on opposite sides of the center module across the upright axis, aligned in parallel and facing a common direction), a power supply, a sensor array (comprising an inertial measurement system, an orientation measurement system; and an absolute position measurement system), a wireless transceiver, a thruster controller, a processor (operably connected to the sensor array, the wireless transceiver, and the thruster controller), and two or more thrusters connected to the thruster mounting structure and controlled by the thruster controller,
the method comprising:
receiving an activation signal;
obtaining, by the sensor array, information describing the position, orientation, and movement of the load stability system apparatus;
identifying a target location of the load stability system apparatus;
determining, by the processor, a thrust application vector to move the load stability system apparatus to the identified target location, based on the obtained information describing the position, orientation, and movement of the load stability system apparatus;
rotating the load stability system apparatus by controlling thrust from at least one of the two or more thrusters to align the common direction that at least one of the pairs of thrusters faces with the thrust application vector; and
applying thrust, by at least the pair of thrusters aligned with the thrust application vector, to counteract the swinging of the load.

17. The method of claim 16, wherein the obtaining, identifying, determining, rotating, and applying thrust are performed continuously.

18. The method of claim 16, wherein the identifying a target location of the load stability system apparatus is based on a mode or command state, and receiving the activation signal comprises receiving, by the wireless transceiver, a user selection of the mode or command state comprising one of:
- maintaining a position relative to a fixed or moving point from which the cable is suspended;
- holding a current position;
- moving to a designated coordinate location or a point above the designated coordinate location; and
- following an external target not connected to the suspended load.

19. The method of claim 18, further comprising displaying, on one or more external status indicator lights on the load stability system apparatus or on a remote interactive display in wireless communication with the wireless transceiver, an indication of the current mode or command state of the load stability system apparatus.

20. The method of claim 16, wherein the two or more thrusters are mounted in a fixed orientation relative to the load stability system apparatus, and wherein the rotating at least one of the two or more thrusters to align with the thrust application vector comprises rotating the load stability system apparatus.

21. The method of claim 16, wherein determining, by the processor, a thrust application vector to move the load stability system apparatus to the identified target location, based on the obtained information describing the position, orientation, and movement of the load stability system apparatus comprises using a non-linear state estimator to project near-term future motion of the load stability system apparatus and calculating a dynamic thrust response to the projected near-term future motion of the load stability system apparatus.

22. The method of claim 16, further comprising:
- obtaining, by the sensor array, information describing an obstacle in a path of projected or potential movement of the load stability system apparatus; and
- wherein determining, by the processor, a thrust application vector to move the load stability system apparatus to the identified target location, based on the obtained information describing the position, orientation, and movement of the load stability system apparatus comprises determining an adjusted vector to steer the load stability system apparatus and the load clear of the obstacle.

23. The method of claim 16, wherein the obtaining, identifying, determining, rotating, and applying thrust cause the load stability system apparatus to autonomously counteract the swinging of the load including any of a pendulum swing, a conical pendulum swing, and a twisting or rotational motion.

24. The method of claim 16, wherein the load stability system apparatus is agnostic of a platform from which the cable is suspended, such that the load stability system apparatus does not control the platform from which the cable is suspended.

25. An autonomous load stability system apparatus that is suspended by a cable, the load stability system apparatus comprising a non-transitory computer-readable storage medium having stored thereon instructions that, when executed by a processor in the load stability system apparatus, configure the processor to control the load stability system apparatus to counteract a swinging of a load suspended below the load stability system apparatus,
wherein the load stability system apparatus includes a center module (comprising an attachment point for the cable, configured to allow rotation of the cable relative to the apparatus such that a twist or rotational motion of the cable is decoupled from an orientation of the apparatus and the apparatus in operation is orientable to any direction around an upright axis between the cable and the load, an attachment point for the load, configured to suspend the load in operation below the load stability system apparatus, a tensile structural element along the upright axis between the attachment point for the cable and the attachment point for the load, wherein an upper surface of the tensile structural element is coupled to the attachment point for the cable and a lower surface of the tensile structural element is coupled to the attachment point for the load, and a thruster mounting structure connected to the tensile structural element, configured to mount an even number of thrusters to the center module in a fixed position, wherein the fixed position comprises pairs of thrusters arranged on opposite sides of the center module across the upright axis, aligned in parallel and facing a common direction), a power supply, a sensor array (comprising an inertial measurement system, an orientation measurement system; and an absolute position measurement system), a wireless transceiver, a thruster controller, the processor (operably connected to the sensor array, the wireless transceiver, and the thruster controller), and two or more thrusters connected to the thruster mounting structure and controlled by the thruster controller,
wherein the instructions comprise:
receiving an activation signal, wherein the activation signal includes a user selection of a mode or command state comprising one of:
- maintaining a position relative to a fixed or moving point from which the cable is suspended;
- holding a current position;
- moving to a designated coordinate location or a point above the designated coordinate location; and
- following an external target not connected to the suspended load;

obtaining, by the sensor array, information describing the position, orientation, and movement of the load stability system apparatus;
identifying a target location of the load stability system apparatus, based on the mode or command state;
determining, by the processor, a thrust application vector to move the load stability system apparatus to the identified target location, based on the obtained information describing the position, orientation, and movement of the load stability system apparatus;
rotating the load stability system apparatus by controlling thrust from at least one of the two or more thrusters to align the common direction that the at least one of the pairs of thrusters faces with the thrust application vector; and
applying thrust, by at least the pair of thrusters aligned with the thrust application vector, to counteract the swinging of the load.

26. The autonomous load stability system apparatus of claim 25, wherein the obtaining, identifying, determining, rotating, and applying thrust cause the load stability system apparatus to autonomously counteract the swinging of the load including any of a pendulum swing, a conical pendulum swing, and a twisting or rotational motion.

27. A method of counteracting a motion of a suspended load, the method comprising:
attaching a load stability system apparatus to a cable for suspending the load, wherein the load stability system apparatus includes a center module (comprising an attachment point for the cable, configured to allow rotation of the cable relative to the apparatus such that a twist or rotational motion of the cable is decoupled from an orientation of the apparatus and the apparatus in operation is orientable to any direction around an upright axis between the cable and the load, an attachment point for the load, configured to suspend the load in operation below the load stability system apparatus, a tensile structural element along the upright axis between the attachment point for the cable and the attachment point for the load, wherein an upper surface of the tensile structural element is coupled to the attachment point for the cable and a lower surface of the tensile structural element is coupled to the attachment point for the load, and a thruster mounting structure connected to the tensile structural element, configured to mount an even number of thrusters to the center module in a fixed position, wherein the fixed position comprises pairs of thrusters arranged on opposite sides of the center module across the upright axis, aligned in parallel and facing a common direction), a power supply, a sensor array (comprising an inertial measurement system, an orientation measurement system; and an absolute position measurement system), a wireless transceiver, a thruster controller, a processor (operably connected to the sensor array, the wireless transceiver, and the thruster controller), and two or more thrusters connected to the thruster mounting structure and controlled by the thruster controller, wherein the processor is configured to:

determine a motion of the load, the motion including any of a pendulum swing, a conical pendulum swing, and a twisting or rotational motion, based on the sensor array measurement systems;

orient the apparatus to a thrust application vector, by controlling thrust provided by the at least one of the thrusters in the pairs of thrusters mounted on opposite sides of the center module, such that the common direction that at least one of the pairs of thrusters faces coincides with the thrust application vector; and apply thrust along the thrust application vector to autonomously counteract the motion of the load, by controlling at least the pair of thrusters aligned with the thrust application vector, activating a mode or command state of the load stability system apparatus comprising one of:

maintaining a position relative to a fixed or moving point from which the cable is suspended;

holding a current position;

moving to a designated coordinate location or a point above the designated coordinate location; and following an external target not connected to the suspended load; and causing a motion of the suspended load inconsistent with the activated mode or command state of the load stability system apparatus, such that the thrust applied by the load stability system apparatus along the thrust application vector autonomously counteracts the motion of the suspended load.

28. The method of claim 27, wherein the load stability system apparatus autonomously:

obtains, by the sensor array, information describing the position, orientation, and movement of the load stability system apparatus;

identifies a target location of the load stability system apparatus, based on the mode or command state;

determines, by the processor, the thrust application vector to move the load stability system apparatus to the identified target location, based on the obtained information describing the position, orientation, and movement of the load stability system apparatus;

rotates the load stability system apparatus by controlling thrust from at least one of the two or more thrusters to align the common direction that at least one of the pairs of thrusters faces with the thrust application vector; and applies thrust, by at least the pair of thrusters aligned with the thrust application vector, to counteract the swinging of the load.

* * * * *